United States Patent
Galstian et al.

(10) Patent No.: US 9,201,285 B2
(45) Date of Patent: Dec. 1, 2015

(54) CAPACITIVELY COUPLED ELECTRIC FIELD CONTROL DEVICE

(71) Applicant: LensVector Inc., Sunnyvale, CA (US)

(72) Inventors: Tigran Galstian, Quebec (CA); Vladimir Presniakov, Quebec (CA); Karen Asatryan, Quebec (CA); Amir Tork, Quebec (CA); Armen Zohrabyan, Quebec (CA); Aram Bagramyan, Quebec (CA); Simon Careau, Quebec (CA)

(73) Assignee: LENSVECTOR INC., Sunnyvale, CA (US)

( * ) Notice: Subject to any disclaimer, the term of this patent is extended or adjusted under 35 U.S.C. 154(b) by 0 days.

(21) Appl. No.: 14/076,301

(22) Filed: Nov. 11, 2013

(65) Prior Publication Data

US 2014/0139768 A1    May 22, 2014

Related U.S. Application Data

(60) Provisional application No. 61/725,021, filed on Nov. 11, 2012.

(51) Int. Cl.
G02F 1/13    (2006.01)
G02F 1/29    (2006.01)

(52) U.S. Cl.
CPC ............. *G02F 1/29* (2013.01); *G02F 2001/294* (2013.01); *G02F 2201/128* (2013.01)

(58) Field of Classification Search
USPC ........................................ 349/96, 123, 200
See application file for complete search history.

(56) References Cited

U.S. PATENT DOCUMENTS

| | | | |
|---|---|---|---|
| 7,876,399 B2 * | 1/2011 | Seelhammer et al. | 349/69 |
| 2009/0207330 A1 * | 8/2009 | Jung et al. | 349/39 |
| 2011/0216257 A1 | 9/2011 | Galstian et al. | |
| 2012/0188490 A1 | 7/2012 | Zohrabyan et al. | |

FOREIGN PATENT DOCUMENTS

| | | |
|---|---|---|
| WO | WO 2009/153764 A2 | 12/2009 |
| WO | WO 2012/079178 A1 | 6/2012 |

OTHER PUBLICATIONS

PCT/CA2013/050862 Written opinion.
PCT/CA2013/050862 International search report with related claims.
PCT/CA2013/050862 PCT search strategy.

* cited by examiner

*Primary Examiner* — Lucy Chien
(74) *Attorney, Agent, or Firm* — J-Tek Law PLLC; Jeffrey D. Tekanic; Scott T. Wakeman

(57) ABSTRACT

An electrode structure is proposed for controlling a spatially non-uniform electric field driving a tunable liquid crystal lens or beam steering device. The spatially non-uniform electrode structure enables the generation of a predetermined spatially non-uniform electric field profile where complex capacitive coupling between multiple different electrically floating neighboring electrode segments is employed for the generation of the electrical field of desired form by supplying an initial electric potential to a limited number of electrodes.

21 Claims, 27 Drawing Sheets

Prior Art(Naumov): Modal control liquid crystal (half) lens

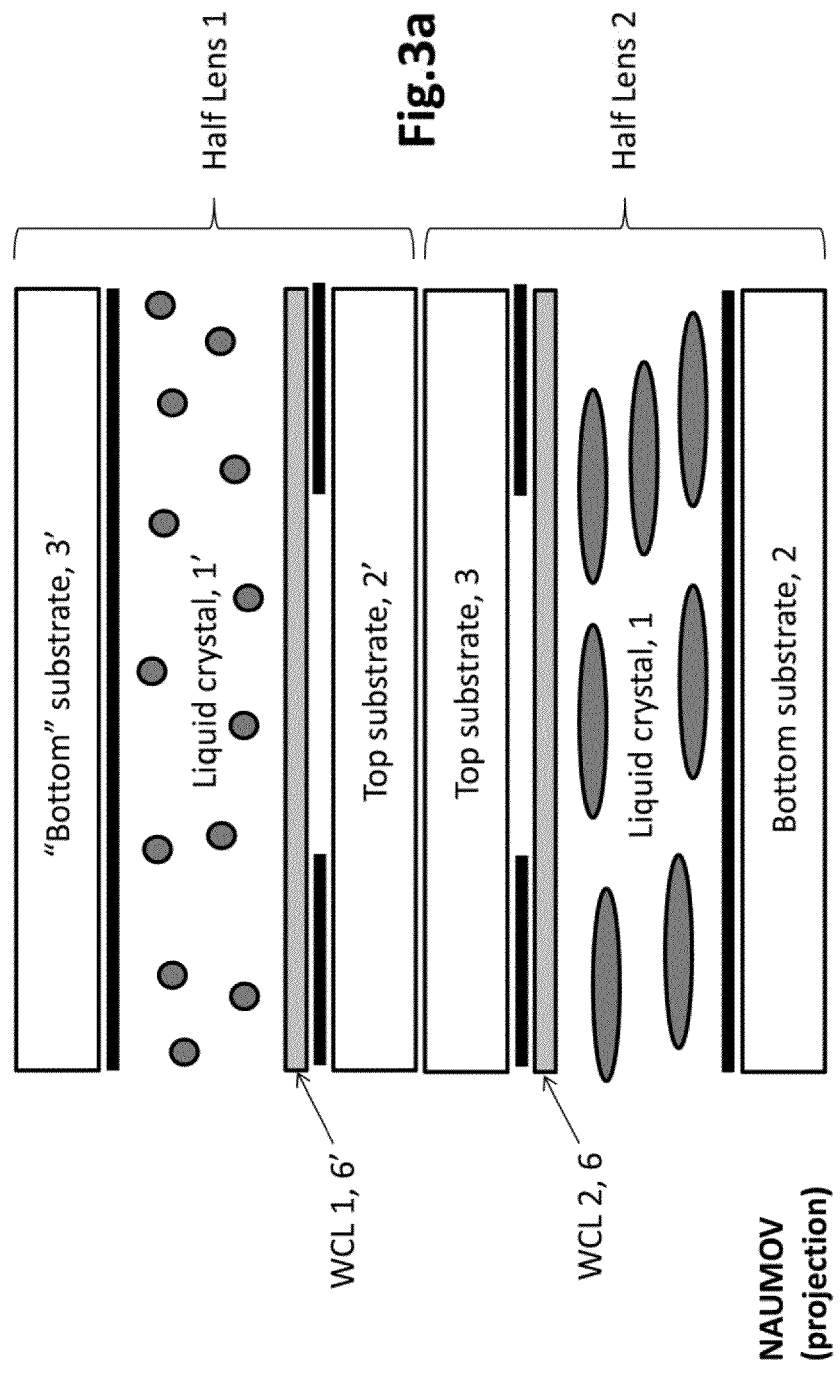

Prior Art: "Modal control" liquid crystal lens *without* HL layer (resistive bridges)

Simple coupling experiment

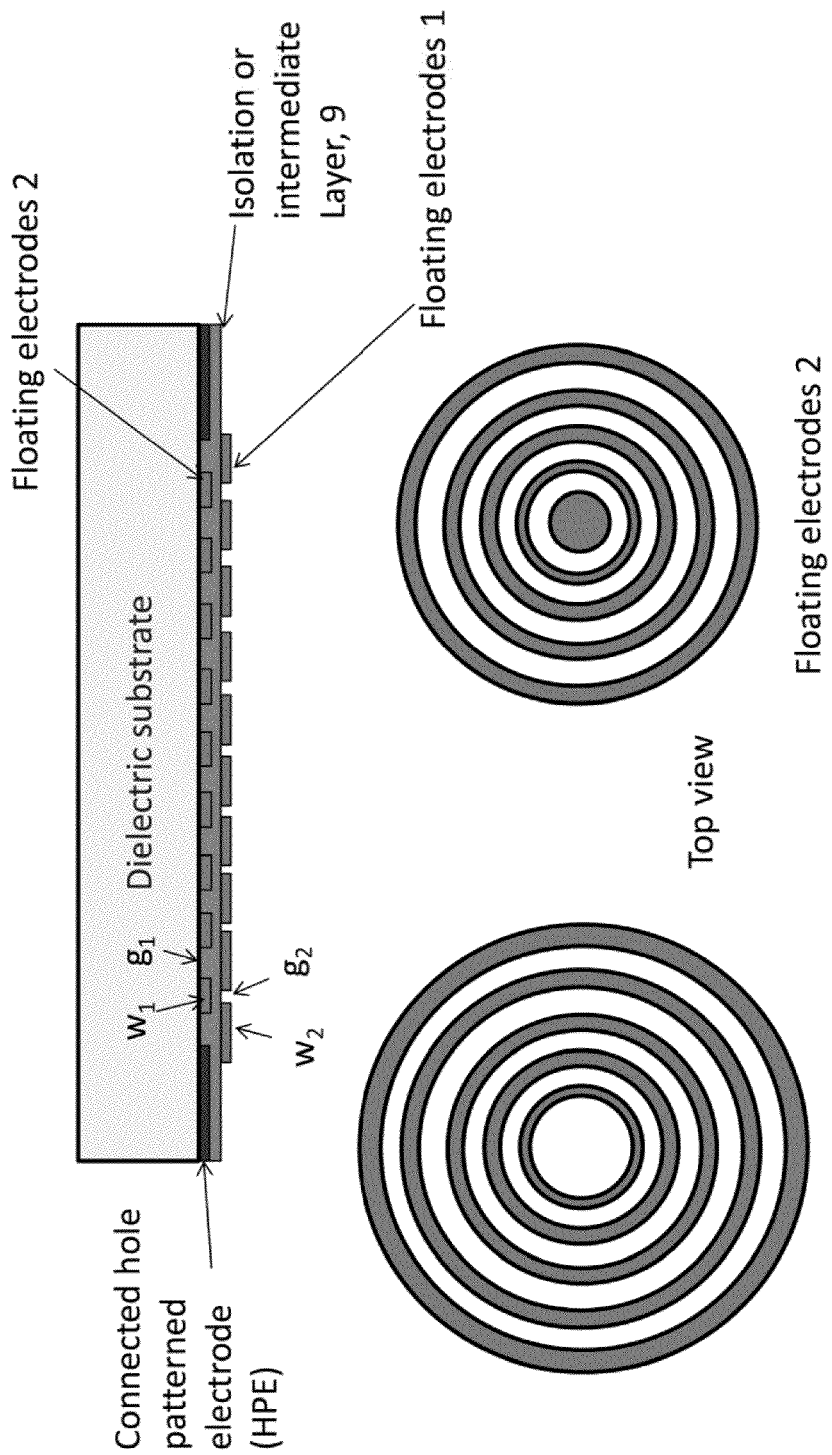

F=1kHz or other fixed frequency defined by LC ionic conductivity;

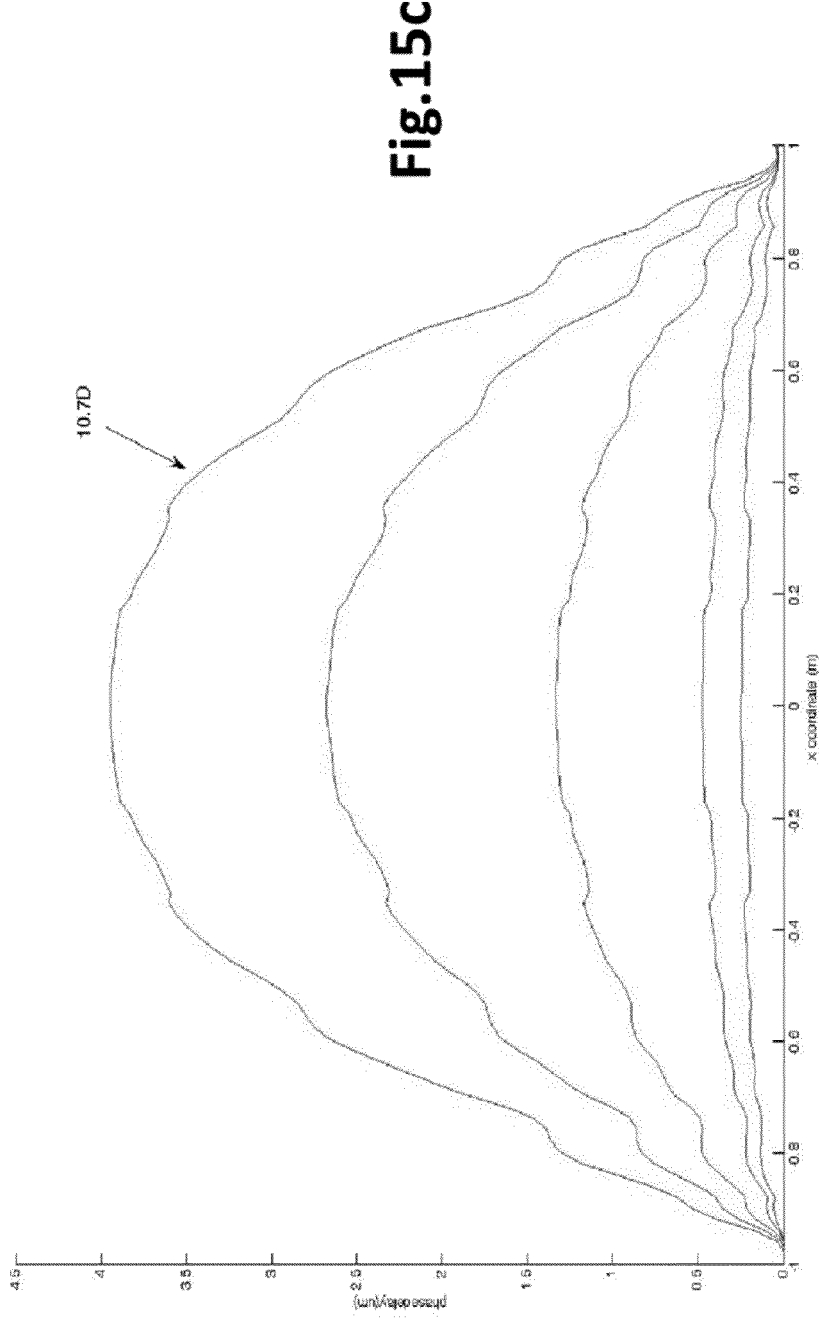
Fig. 15c Waveforms vs driving voltage on the additional electrode $V_2$ (design 2)

Experimental results, design 2

Clear Optical Power (filled diamonds) and RMS aberrations (crosses) versus the voltage $V_2$ applied to the additional TUE.

LensVector: LCL Capacitive bridges

LensVector: LCL Capacitive bridges
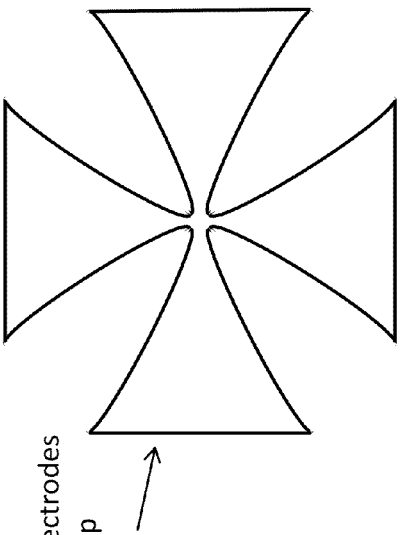
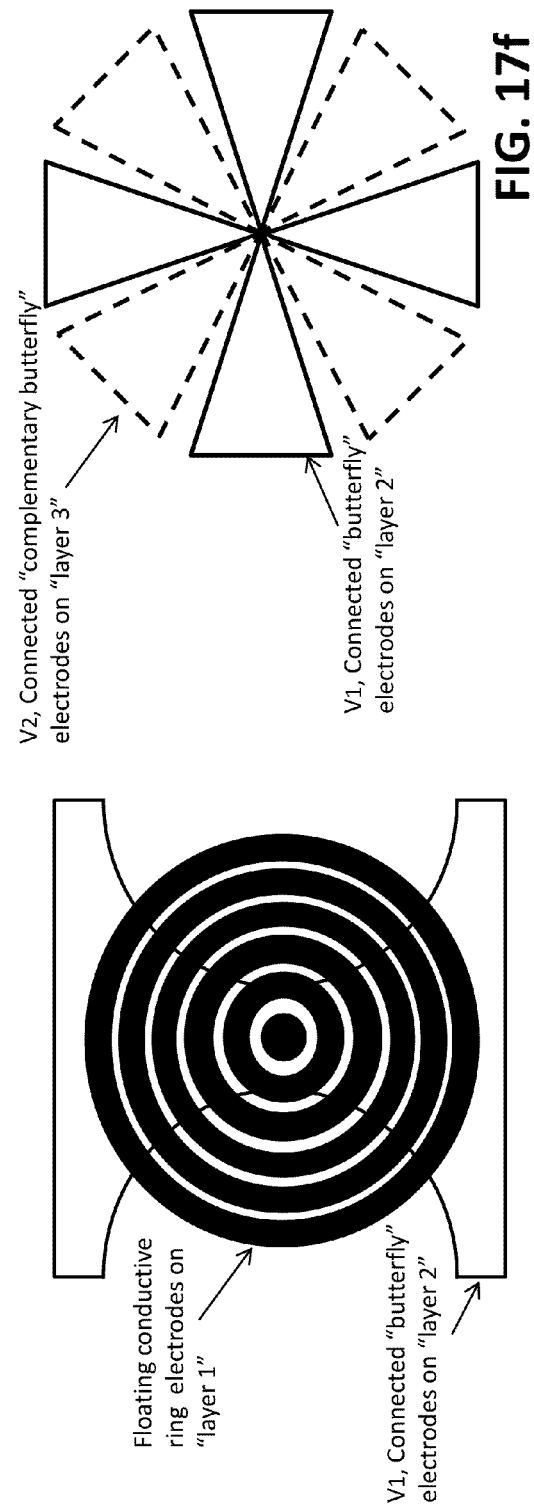

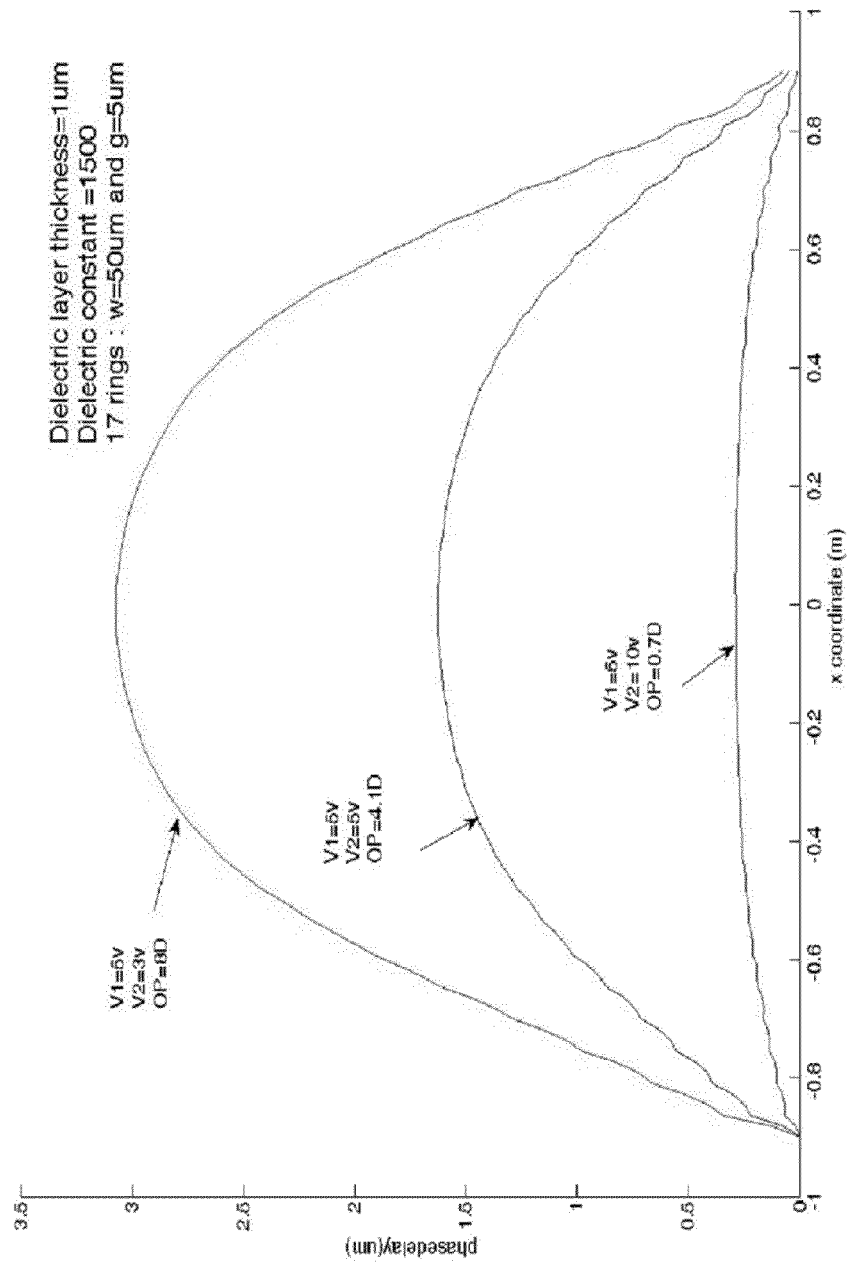

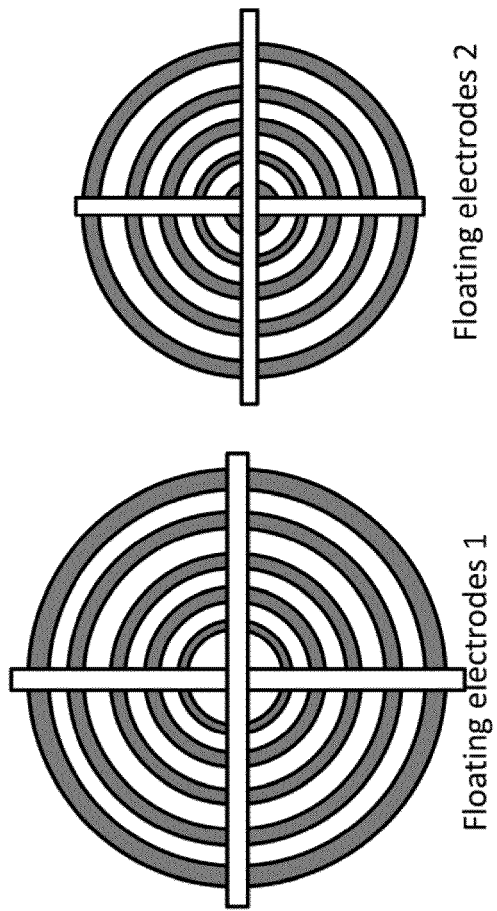

CAPACITIVELY COUPLED ELECTRIC FIELD CONTROL DEVICE

RELATED APPLICATIONS

This application claims priority from U.S. provisional patent application 61/725,021 filed Nov. 11, 2012.

TECHNICAL FIELD

The present invention relates to liquid crystal optical devices and to their control electrodes.

BACKGROUND

Liquid Crystal (LC) displays (LCD) and lenses (LCL) are known in the art. In large majority of cases that use LCs, an electrically variable gradient index (so-called GRIN) optical lens is formed by controlling the relative orientation gradient of the LC molecules in space within the clear aperture (CA) of the device. Then, this molecular orientation being sensitive to the electrical field, the gradient (and respectively, the optical power of the LCL) may be changed by changing the electrical stimulus parameters (voltage, frequency or their combination) without any macroscopic mechanical movement or deformation.

A variety of LCL designs have been proposed that control the orientation of the LC molecules in response to a spatially non uniform electric field, see for example the review of S. SATO, Applications of Liquid Crystals to Variable-Focusing Lenses, OPTICAL REVIEW Vol. 6, No. 6 (1999) 471-485. One, seemingly simple, approach is the use of multiple electrode arrays (such as used in LCDs) to generate the lens-like electric field profile in space. However, the complexity of its manufacturing and of its dynamic control reduces its attractiveness and industrial acceptance.

Another approach was described (see S. SATO above), that uses a combination of a hole-patterned electrode (HPE) and a transparent uniform electrode (TUE), FIG. 1a (hereafter the LC alignment layers and other standard elements of LC cell will be omitted to simplify the drawings. Also schematic cross-sectional views of various designs will be mainly presented for the same reasons). The application of an electrical potential difference on those two electrodes will generate spatially non uniform electric field (between points ACB, as illustrated schematically in the FIG. 1b). Thus, if the electrical potential distribution (and the corresponding electric field) have the appropriate spatial profile then the corresponding reorientation of LC molecules and the refractive index modulation within the CA of the device may have the desired spherical (or aspherical, see hereafter) form enabling thus a good quality lens. The optical power (OP) of such a lens (measured in Diopters) may be expressed as $OP=2 L \Delta n/r^2$, where L is the thickness of the LC layer, $\Delta n$ is the difference of refractive index in the center (around the point C) and at the periphery (around the points A and B) of the lens and r is the radius of the clear aperture. Note that the focal distance F (measured in meters) is the inverse of OP, $F=1/OP$. This design being much simpler to manufacture still has some important drawbacks. Namely, the distance (defined by the LC thickness L+ the thickness of the top substrate H) between the HPE and TUE must be relatively large to ensure smooth spatial profile of the electric field inside the LC layer. This electrode separation necessarily increases the voltages (several tens of volts) required for the control of the LCL.

In an article published by A. F. Naumov et al., entitled "Liquid-Crystal Adaptive Lenses with Modal Control", OPTICS LETTERS/Vol. 23, No. 13/Jul. 1, 1998, an LCL configuration was proposed (shown in FIG. 2), which uses an HPE that is inside of the LC cell (the top substrate of the Sato design, shown in FIG. 1, being flipped at 180°, upside down). In this case, the HPE and TUE are very close to each other (separated just by the LC of thickness L) and a few volts (<5V) are enough for the control of the OP of the LCL. However, the electric field profile would have an abrupt character inside of the LC layer here without specific solutions. This is the reason why a high resistivity or weakly conductive layer (WCL) is cast on the surface of the HPE that smoothens the above mentioned field profile thanks to the very high sheet resistance Rs, which is defined as $R=(d\sigma)^{-1}$, where d is the thickness of the WCL and $\sigma$ is its conductivity. This smoothening phenomenon may be presented by using the concept of attenuation of the electric potential (when going from the periphery to the center of the HPE) in a classical electronic RC circuit where the capacitance of the unit area is defined by the combination of two electrodes (the TUE and the HPE that is covered by a WCL) containing the dielectric LC layer in between. At the same time, the role of the electrical resistance R is mainly played by the sheet resistance Rs of the WCL.

It happens that the "RC factor" of miniature cameras (with CA at the order of 1.5 mm to 2 mm) and the dielectric properties of the LC layer $\in_{LC}$ and its thickness L are such that the sheet resistance Rs of the WCL, that is necessary for smooth electric field profile, is in the range of tens of M$\Omega$/. The fabrication of such films is an extremely difficult task since such electrical properties correspond to the transition (often called "percolation") zone. In addition, the consumer product cameras are supposed to work with unpolarized light. This requires the use of two LC layers (with their molecules being oriented in perpendicular planes, shown in FIG. 3a) to handle two cross oriented polarizations of unpolarized light. To have two such "half" lenses focusing in the same way, we need to have two WCLs of the same Rs (within $\approx\pm3\%$). This imposes very severe conditions on the manufacturing of a polarization independent "full" lens, given that the repeatability of this sheet resistance is very poor, as demonstrated in FIG. 3b. There is another fundamental limitation to this approach: the attenuation of the electrical potential (when going from the periphery of the HPE, points A or B, towards the center of the lens, the point C) is defined by the physical nature of the RC circuit and is very difficult to control and obtain specific aspherical profiles, which are required to have good optical image quality. Finally, all materials with appropriate Rs values (that we know so far) are very sensitive to temperature variations.

Several alternative approaches have been developed to address, at least partially, the problems of Naumov's geometry. One of them (proposed by LensVector 1) is the use of a single WCL to eliminate the severe requirements of manufacturing repeatability, shown in FIG. 4. In this configuration, the HPE and the WCL are positioned between two substrates (almost symmetrically) which serve as bottom and top substrates for two cross oriented LC layers. Thus, the same control electrode structure (HPE+WCL) is used to drive both LC layers similarly.

An alternative approach (shown in FIG. 5) was proposed by B. Wang, M. Ye, M. Yamaguchi, and S. Sato, Thin Liquid Crystal Lens with Low Driving Voltages, Japanese Journal of Applied Physics 48 (2009) 098004. In this geometry, the WCL layer is close to the LC layers, while there is an additional electrically connected disc shaped electrode (DSE) in the middle of HPE, both being positioned outside of the LC cell. While this approach helps to avoid transitory molecular orientational defects (so-called disclinations) and to achieve a better control of the profile of electric field, it still suffers from several drawbacks, including the problem of manufacturability of the WCL. This is because, two WCLs (one for each LC layer) are still needed here or only one WCL and control electrode (HPE+DSE) may be used but it must be positioned relatively far from the TUE since now two LC layers must be driven by the same HPE+DSE structure). In addition, here there is a need to have two independent continuously variable voltages $V_1$ and $V_2$ to drive the LCL. Thus, the grounding of the TUE and applying the voltage $V_1$ on the HPE may create a spatially non uniform potential distribution and corresponding optical power (as shown schematically by the solid curve in FIG. 5b). At the same time, the application of the voltage $V_2$ to the DSE may generate a uniform electrical potential (as demonstrated by the solid and dashed horizontal lines, shown in FIG. 5b) avoiding thus the appearance of disclinations or allowing the continuous control of the optical power and aberrations of the lens. The absolute values of those voltages also are still higher than those used in the Naumov's approach (because of the additional distance between electrodes imposed by the thickness H of the top electrode). This last point was addressed by Sato's group (in another article by M. Ye at al., Low-Voltage-Driving Liquid Crystal Lens, Japanese Journal of Applied Physics 49 (2010) 100204, RAPID COMMUNICATION) by flipping upside-down the top substrate, by covering, the electrodes with 1 um SiO2 film and by using (as WCL) a highly resistive film of water-borne thermosetting paint (TWH-1, Mitsubishi Materials Electronic Chemicals). Finally, there are still some significant wave front (aberration) problems with this double voltage controlled scheme.

To resolve the remaining aberration (wave front) problems, LensVector 2 has introduced another (simpler) approach, where a transparent floating (non-connected) conductive layer (in general in the form of a disc) is introduced between the two cross oriented LC layers of Naumov's design, used in the "full" lens geometry, shown in FIG. 6. The presence of the floating conductive layer improves significantly (compared to Sato's and Naumov's designs) the wave front profile and the Modulation Transfer Function (MTF) of cameras using such lenses. In addition, the unique voltage required for the lens driving is very low and the device operates by frequency control.

Alternative approaches were proposed to resolve all three problems (poor WCL repeatability, high voltage and undesired wave front). One of them, proposed by N. Hashimoto, Liquid crystal optical element and method for manufacturing thereof, U.S. Pat. No. 7,619,713 B2, Nov. 17, 2009, is shown in FIG. 7. The basic difference of this design, compared to the Naumov's approach, is the absence of the WCL. In fact, Hashimoto proposes the use of optically transparent multiple concentric ring shaped electrodes (CRSE), which are interconnected via high resistivity "bridges" (the schematic side view is shown on the upper picture and the top view is shown in FIG. 8). This "resistively-bridged" structure plays the same role as the WCL in creating a voltage spatial profile over the aperture. The advantage of this approach is that we can adjust the individual resistivity values ($R_1$, $R_2$, etc.) of those bridges and obtain the desired wave front. Also, we need two small voltage $V_1$ and $V_2$ (applied to the center and to the periphery of the external ring shaped electrode; the TUE being grounded) to drive the lens. The manufacturing tolerances on the resistance trimming here can be expected to be very difficult to meet.

Another approach, proposed by Bos et al. Tunable electro-optic liquid crystal lenses and methods for forming the lenses, US Patent Application, Pub. No.: U.S. 2011/0025955 A1, Feb. 3, 2011, is shown in FIG. 9. Here, in addition to the resistive bridges (described by Hashimoto), we can also find a description of individually addressable CRSEs. Thus, in addition to manufacturing problems, the dynamic control of such lenses will be complicated (similar to LCDs).

Finally, an intermediate solution was proposed by V. Kato et al. Automatic focusing apparatus, US Patent Application, Pub. No. U.S. 2007/0268417 A1, Nov. 22, 2007, where there is a central DSE and a peripheral HPE, both connected to power supplies (with correspondingly voltages $V_1$ and $V_2$) while all intermediate CRSEs are connected via the resistive bridges to the DSE and HPE. This approach also suffers from manufacturability problems.

As we have already mentioned, in three above mentioned cases, we deal with either resistive bridges or individual control of concentric electrodes and thus the questions of wave front shape control and low voltage may be resolved in general. However, there are significant drawbacks in those approaches too. One of them is the abrupt variation of the field, particularly in the periphery of individual electrode segments. Thus in the area covered by one electrode segment, the potential is uniform, but there is an abrupt change between those segments. This requires very close electrode segments to minimize the impact of abrupt changes of the electrical potential. In addition, the relatively flat zones in the wave front will degrade the MTF of the camera and thus a very high number of such electrode segments is required. This, in turn increase the requirements on manufacturing precisions on those segments, on the resistive bridges and the dynamic control of voltage distributions of those structures also becomes extremely difficult to handle in practice.

SUMMARY

In accordance with the above described situation, a need exists to develop an alternative way of generating of a non-uniform electric field that would be easier to manufacture and to control and will also provide low voltages and good optical quality.

In the following sections, we shall propose a different way of obtaining such results. Indeed, we shall propose a spatially non uniform electric field generation method, its fabrication and use in an electrically variable liquid crystal lens or image stabilization devices.

A spatially non-uniform electrode structure is proposed that enables the generation of a predetermined spatially non-uniform electric field profile where the complex capacitive coupling between different non-connected (or floating) neighboring electrode segments is used for the generation of the said field of desired form thanks to the supply of the initial electric potential to a limited number of electrodes.

In some cases, one of the connected (powered) electrodes is a transparent uniform electrode (such as ITO, for example) with electrical potential UTUE and the second connected electrode is a hole-patterned (or ring shaped) electrode with another electrical potential UHPE, the remaining electrode segments i being non-connected (floating) and having decreasing electrical potentials Ui the values of which depend upon their position with respect to their neighbor electrodes (placed at the same or at another level) and upon the intermediate separation layer being placed between the double layer of floating electrode segments (with potentials UHPE, U1, 2, 3, . . . ) and the transparent uniform electrode with potential UTUE.

The intermediate separation layer can include one or more liquid crystal layers.

The intermediate separation layer can also include a material with complex (real and imaginary) dielectric constant.

The spatially non uniform electrode structure can include two levels of multiple floating concentric electrode arrays, those two levels being separated by a material layer having real and imaginary parts of dielectric constant and enabling the predetermined degree of electrical coupling of the potentials Uup,m and Udown,m+1 between different floating electrode zones (zone m at upper level and zone m+1 at bottom level).

The multiple floating concentric electrode arrays can be positioned between the transparent uniform electrode (with potential U1) and another transparent uniform electrode with a variable potential Uv, dielectric (isolation) layers being placed between the double layer of floating electrode segments and the two transparent uniform electrodes.

In some embodiments, a liquid crystal lens or optical device comprises a liquid crystal cell having:
- planar cell walls;
- alignment coatings on the cell walls;
- a liquid crystal material in contact with the cell walls;
- an electrode structure having:
  - a plurality of capacitively coupled electrode segments separated by at least one insulating layer;
  - an opposed electrode;
  - wherein an electric field can be provided between the electrode segments and the opposed electrode within the liquid crystal cell;
  - wherein a voltage applied to a first segment of the plurality of segments can induce a reduced voltage in subsequent capacitively coupled segments of said plurality of segments;
  - wherein the arrangement of said segments corresponds to a desired electric field spatial profile across an aperture of the liquid crystal cell.

BRIEF DESCRIPTION OF THE DRAWINGS

The invention will be better understood by way of the following detailed description of embodiments of the invention with reference to the appended drawings, in which:

FIG. 1a is a schematic representation of a prior art liquid crystal lens (with polarization dependence; "half" lens) using an "external" (to the LC cell) hole-patterned electrode in combination with a transparent uniform electrode that is positioned at "far enough" distance and driven with one variable voltage, $V_1$.

FIG. 1b is a schematic representation of the profile of spatially non uniform (between points AC and B) electric field potential that may be obtained by means of the lens described in FIG. 1a.

FIG. 3a is a schematic representation of a possible liquid crystal lens without polarization dependence ("full" lens) by means of two 90° rotated LC lenses described in FIG. 2 thus using two weakly conductive layers.

FIG. 3b is a demonstration of the typical dispersion of sheet resistance values and the acceptable zone to build a full lens shown in FIG. 3a.

FIG. 13b is a schematic representation of the top substrate (used in FIG. 13a) bearing the two levels of multiple transparent concentric ring electrodes which are floating (except the external ring electrode); upper figure shows the cress-sectional view; bottom figures are top views of ring structures.

FIG. 13c shows clear optical power (in diopters) experimentally obtained by using the "half" lens structure shown in FIG. 13a.

FIG. 13d shows RMS aberrations (in um) experimentally obtained by using the "half" lens structure shown in FIG. 13a.

FIG. 15b shows the theoretically predicted optical power values (in Diopters) versus the control voltage of the additional transparent uniform electrode, introduced in FIG. 15a; the "half" lens structure of FIG. 13a is used with the additional transparent conductive electrode, described in FIG. 15a.

FIG. 15c shows the theoretically predicted wave forms (versus the lateral coordinates) for various optical power values; the "half" lens structure of FIG. 13a is used with the additional transparent conductive electrode, described in FIG. 15a.

FIG. 15d shows the experimentally obtained optical power and RMS aberration values versus the control voltage of the additional transparent uniform electrode, introduced in FIG. 15a; the "half" lens structure of FIG. 13a is used with the additional transparent conductive electrode, described in FIG. 15a.

FIG. 17d shows another possible way of achieving capacitive coupling between neighboring concentric ring electrodes by using a double (with two axes) "Malt-cross" connected electrode instead of using discrete capacitive bridges.

FIG. 17e shows the combination of floating ring shaped electrodes (at level 1) and of the butterfly capacitive electrode with a voltage $V_1$ applied (at level 2).

FIG. 17f shows a possible way of adding a third connected electrode (level 3 and with a voltage $V_2$ applied) that may be used additionally (to the butterfly electrode) and in a complementary way to control the field profile across the lateral direction of the lens.

FIG. 18b shows the theoretically predicted wave fronts versus the lateral coordinate for various optical power values by using the "half" lens described in FIG. 18a.

FIG. 19a shows schematically the possible segmentation of external connected electrode to perform tilt, image stabilization and additional aberration correction functions.

FIG. 19b shows schematically the possible segmentation of floating (non-connected) concentric electrode structures to perform tilt, image stabilization and additional aberration correction functions.

DETAILED DESCRIPTION

Capacitive Coupled Optical Device Structure And Operation

Figure 1:
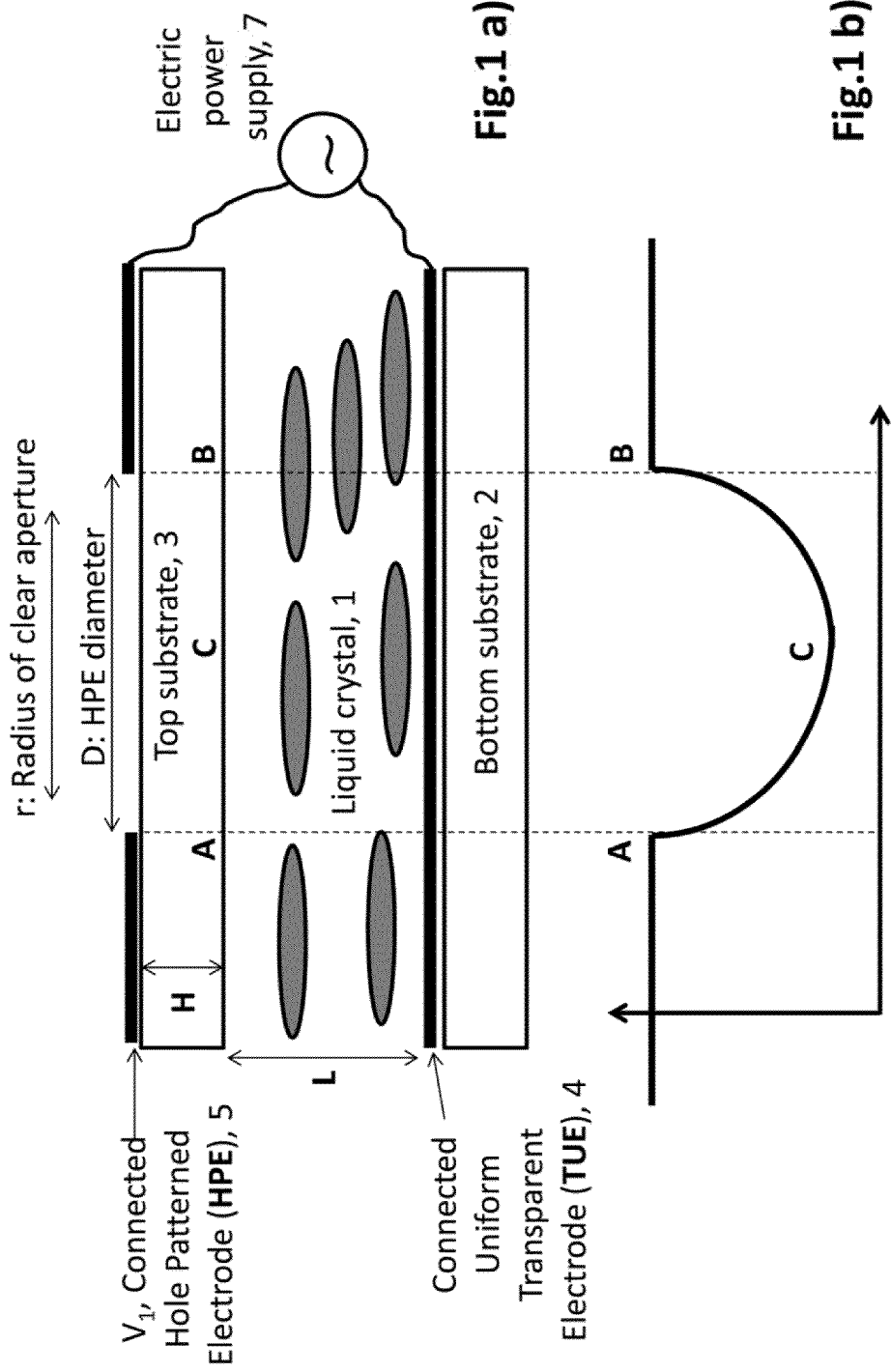
Figure 2:
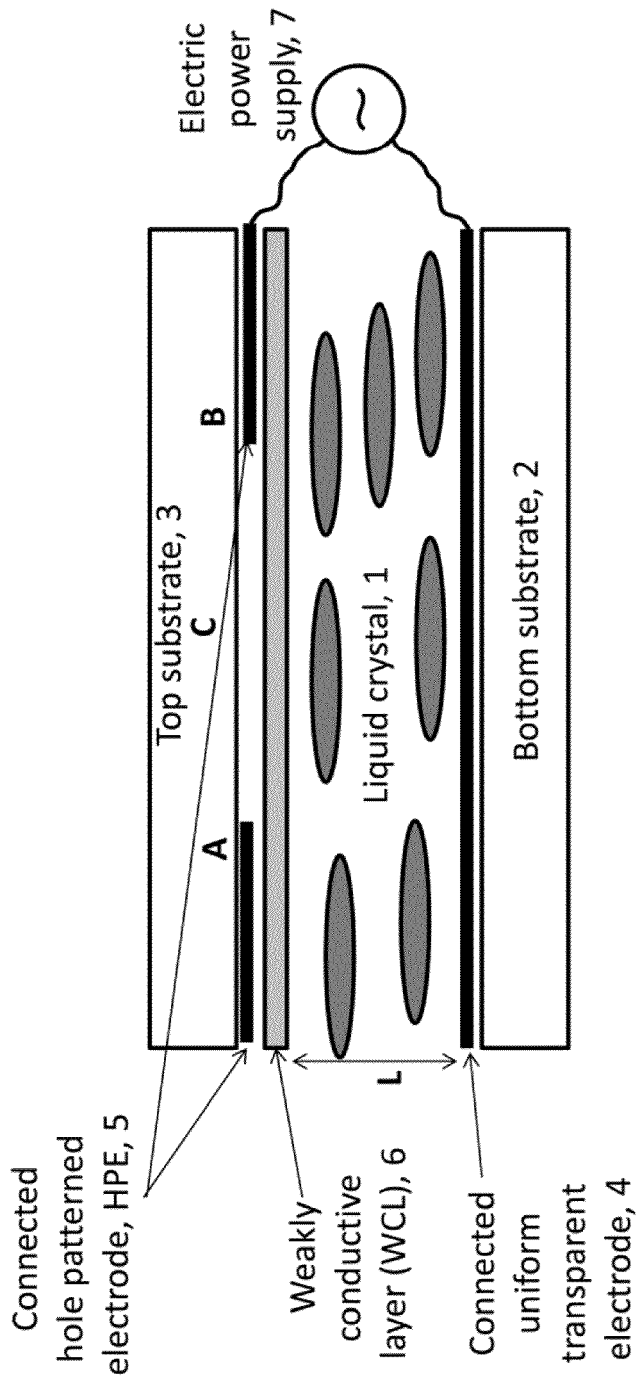
FIG. 2 is a schematic representation of a prior art liquid crystal lens (with polarization dependence; "half" lens) using a high resistivity or weakly conductive layer coated "internal" (to the LC cell) hole-patterned electrode in combination with a transparent uniform electrode and driven with one variable voltage, $V_1$ and frequency F.
Figure 3B:
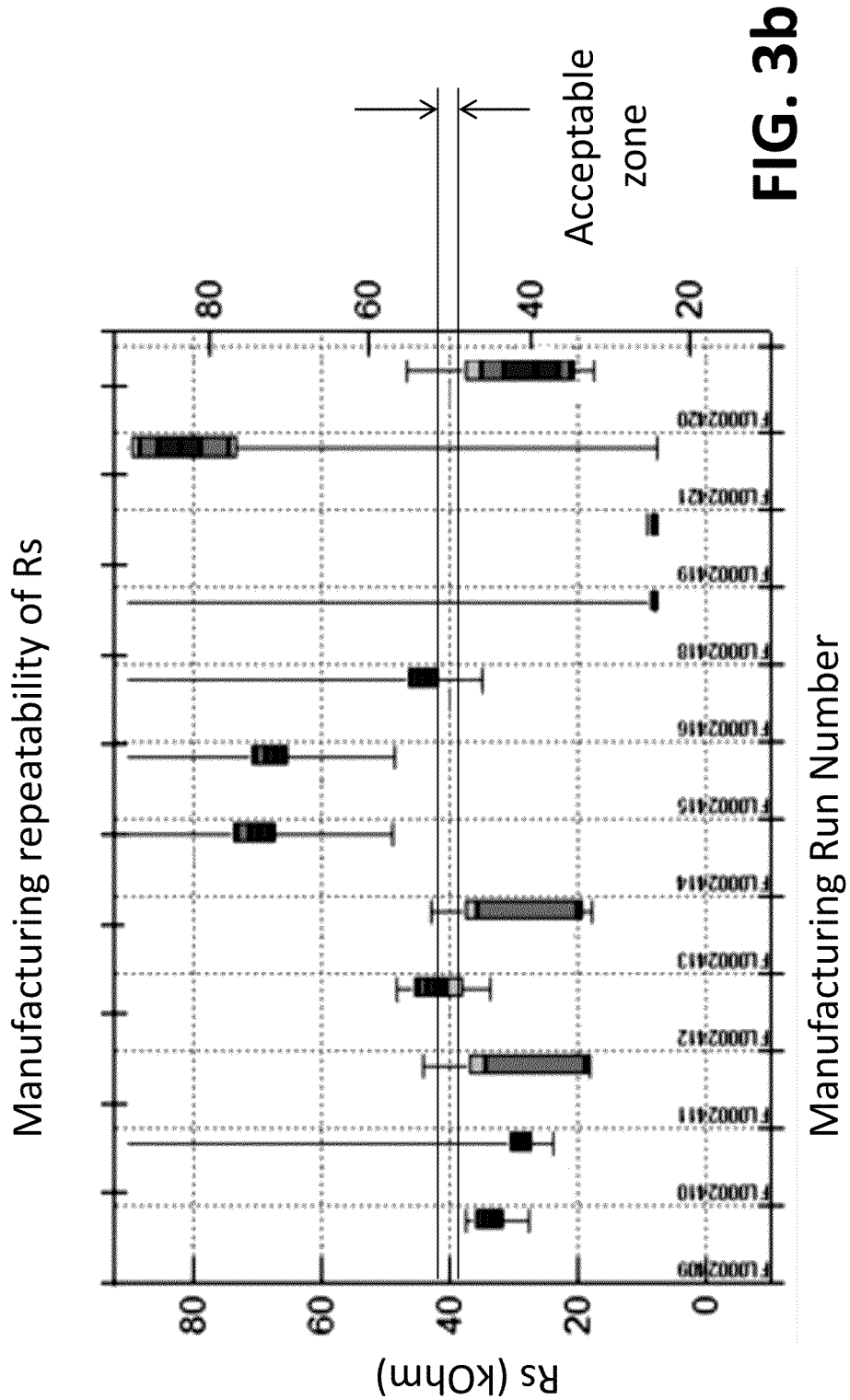
Figure 4:
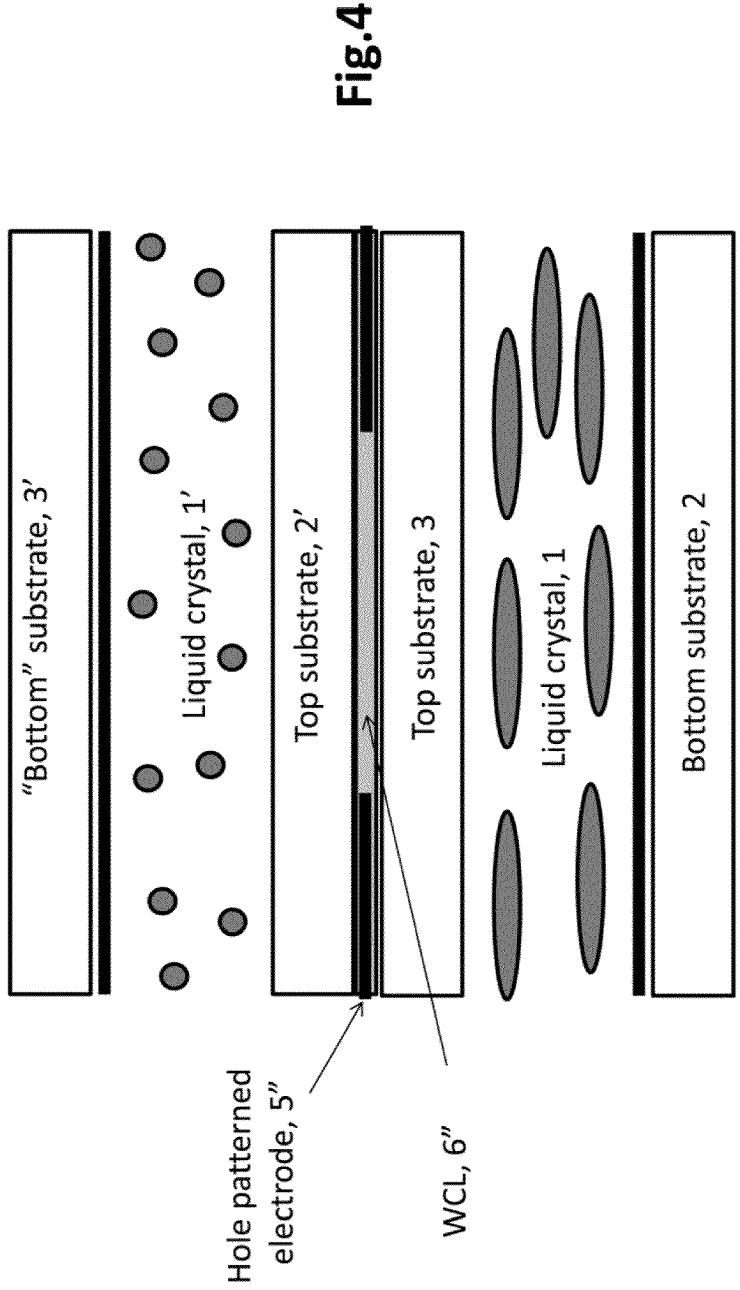
FIG. 4 is a schematic representation of an alternative liquid crystal lens without polarization dependence ("full" lens) by using only one weakly conductive layer.
Figure 5:
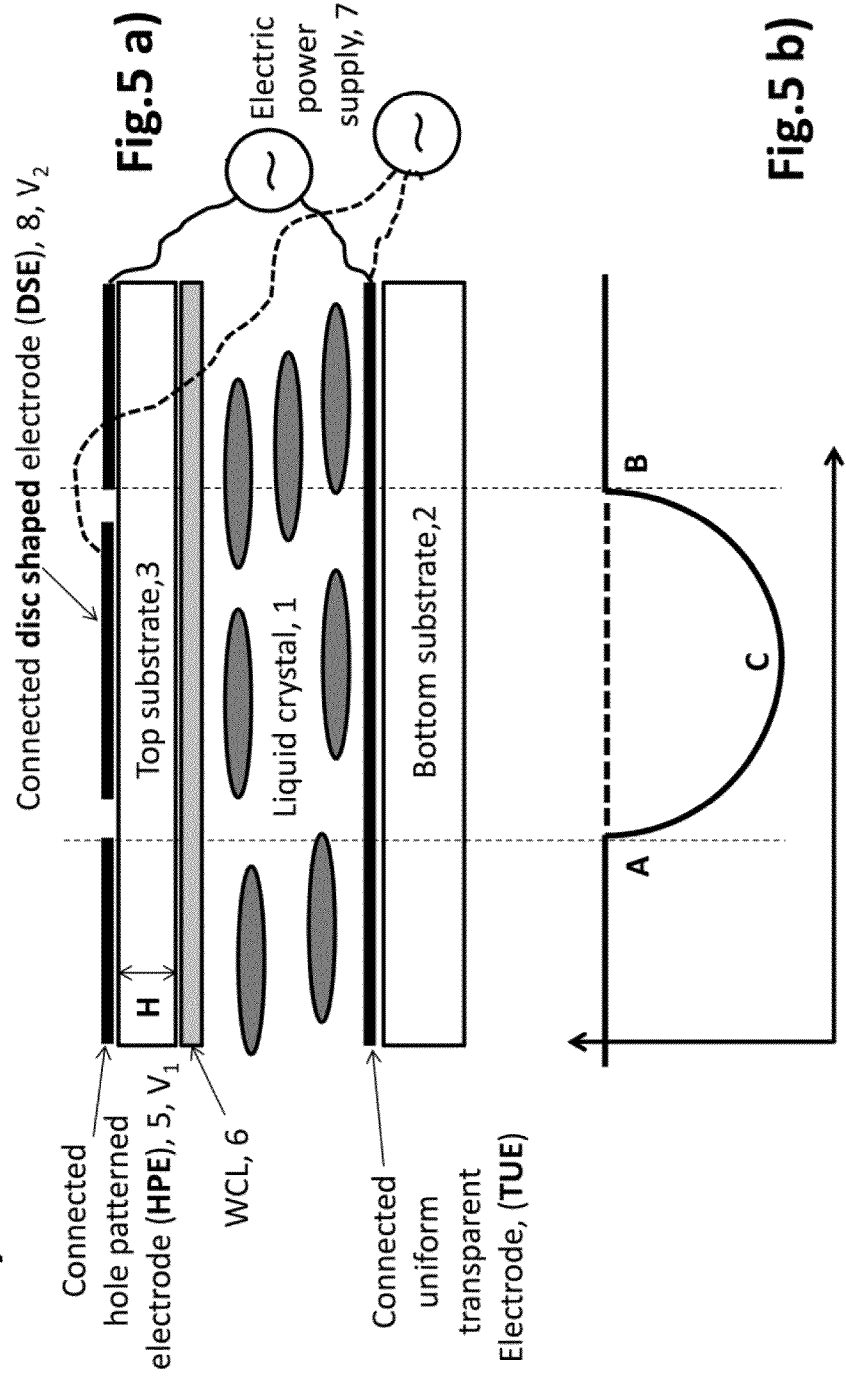
FIG. 5a is a schematic representation of an alternative liquid crystal lens (with polarization dependence; "half" lens) by using an additional disc shaped electrode and two variable voltages $V_1$ and $V_2$ to control the lens.
FIG. 5b is a schematic representation of the electric potential profile when only the hole-patterned electrode is activated (solid curve) and when the disc shaped electrode also is activated similarly (solid and dashed horizontal lines), $V_1=V_2$.
Figure 6:
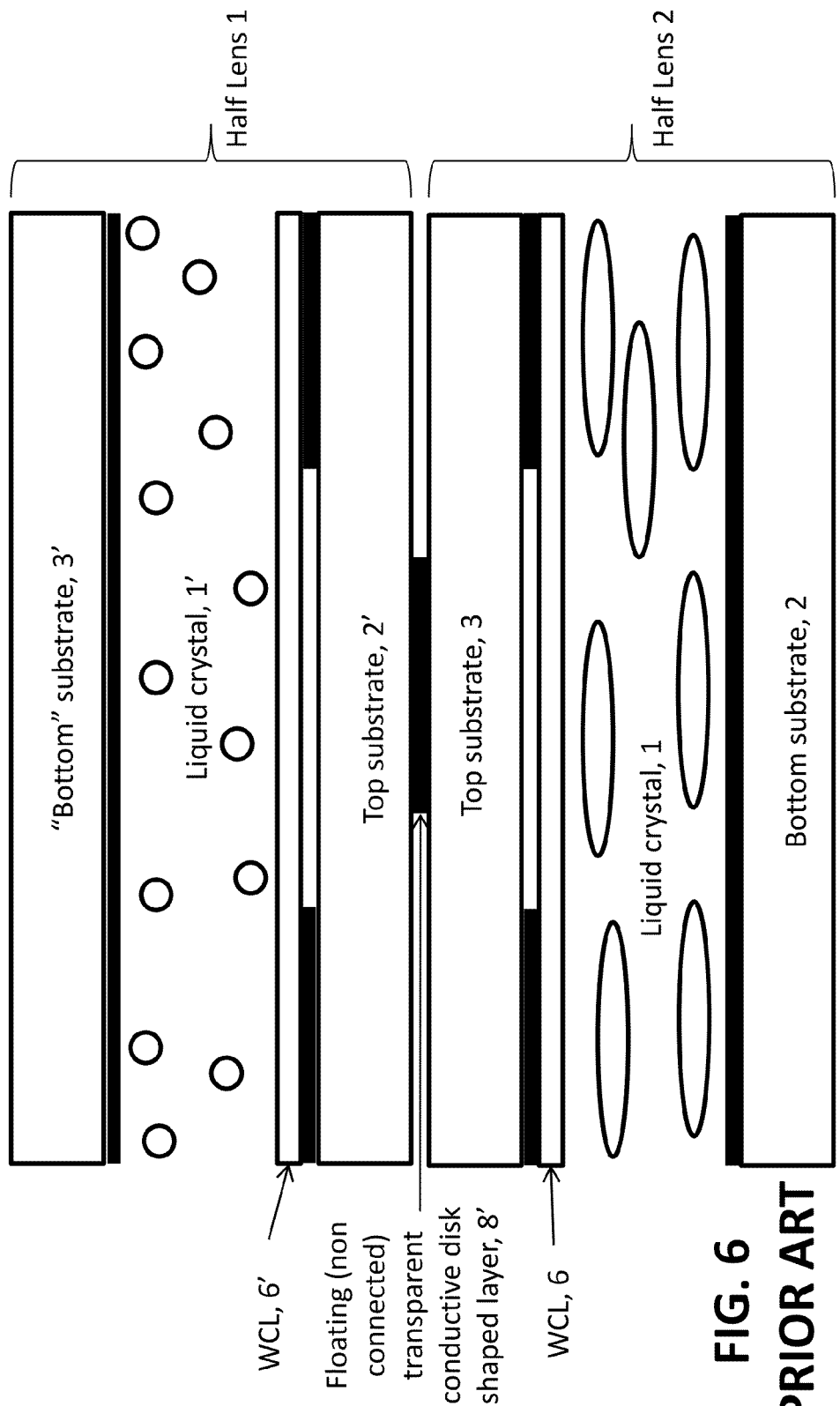
FIG. 6 is a schematic representation of the polarization independent LCL ("full" lens) using one common floating conductive layer correcting the light wave front.
Figure 7:
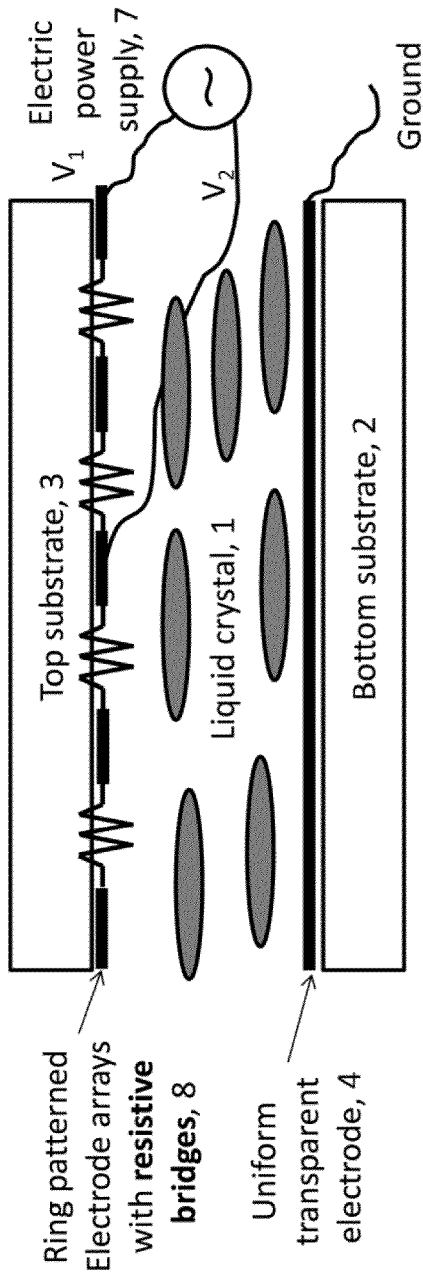
FIG. 7 is schematic representation of the polarization dependent LCL ("half" lens) using multiple transparent concentric ring electrodes part of which are coupled by resistive bridges and others are connected to power supplies.
Figure 8:
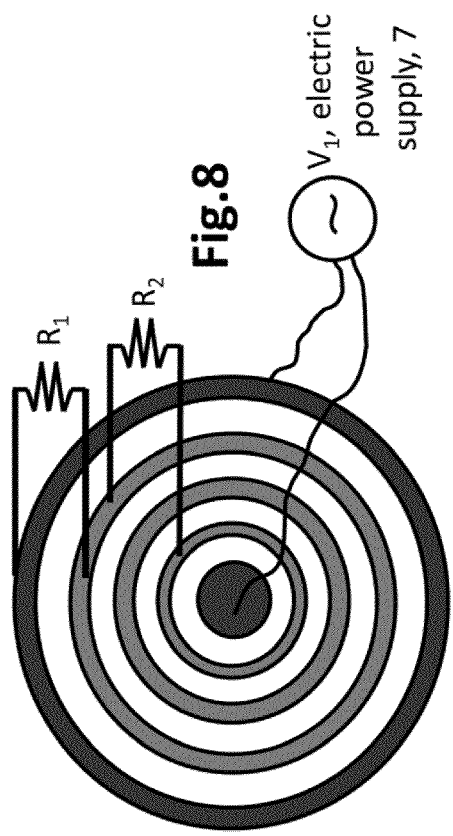
FIG. 8 is a plan view of the lens of FIG. 7.
Figure 9:
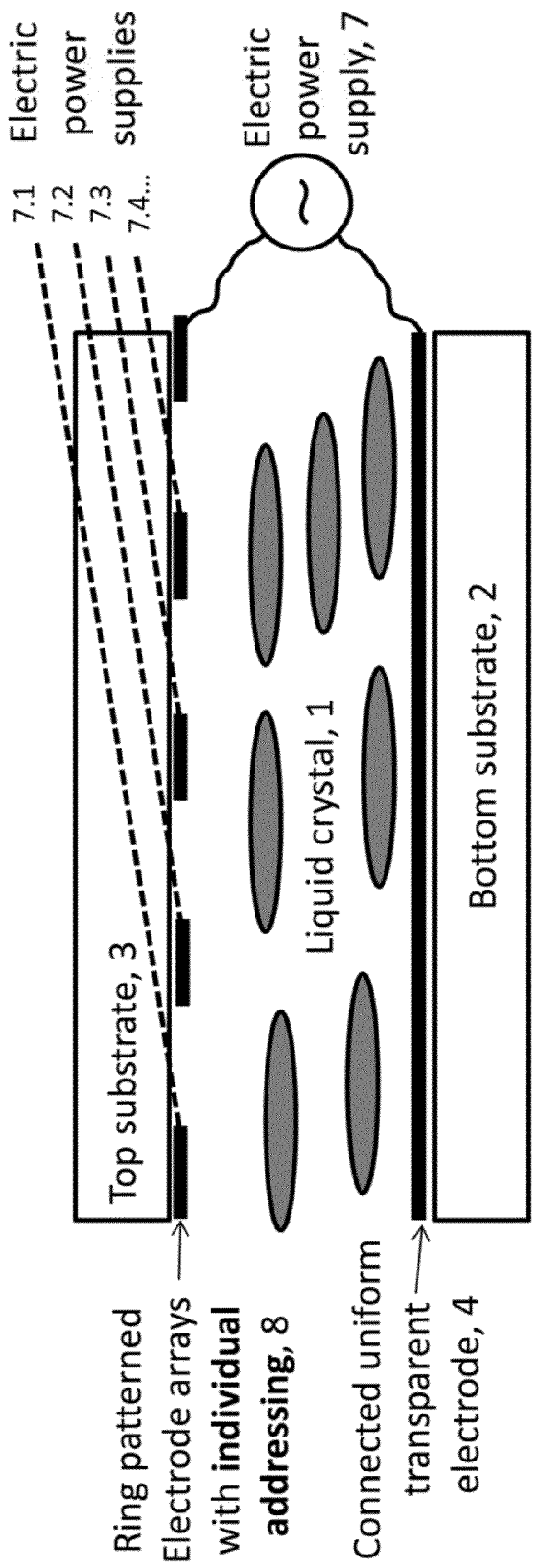
FIG. 9 is a schematic representation of the polarization dependent LCL ("half" lens) using multiple transparent concentric ring electrodes which are connected to power supplies and are individually controlled.
Figure 10:
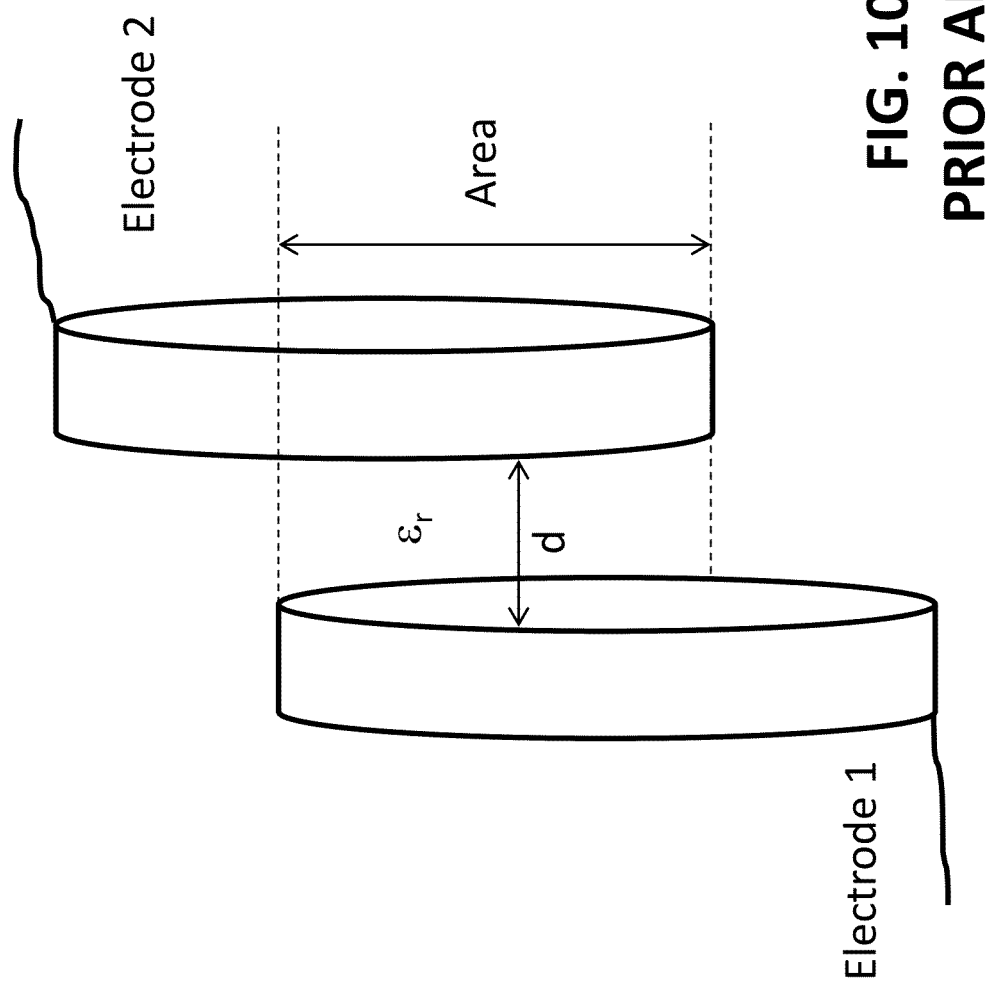
FIG. 10 is a schematic representation of the capacitive coupling principle.

The above mentioned problems were the reasons why we propose here a different approach that is based on the capacitive coupling phenomenon. Thus, FIG. 10 shows schematically the principle of such coupling by using two electrodes that are positioned close enough to allow coupling of their electrical potentials, the classical formulation of capacitance formed by those electrodes being (just for example) $C = \in_r \in_0 A/d$, where C is the capacitance; A is the area of overlap of the two plates; $\in_r$ is the relative static permittivity (sometimes called the dielectric constant) of the "separation" (further called also "intermediate material") material filled between the plates; $\in_0$ is the dielectric constant of vacuum; and d is the separation distance between the plates.

Figure 11:
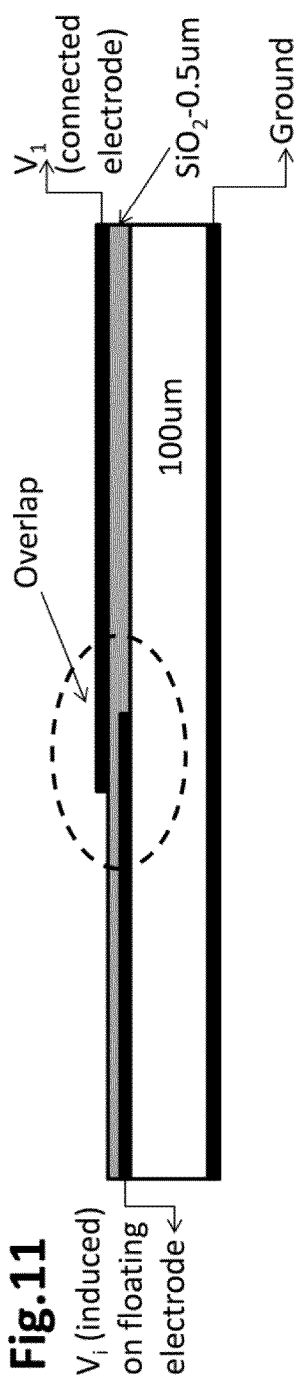
FIG. 11 is a schematic representation of the capacitive coupling experiment.
Figure 12:
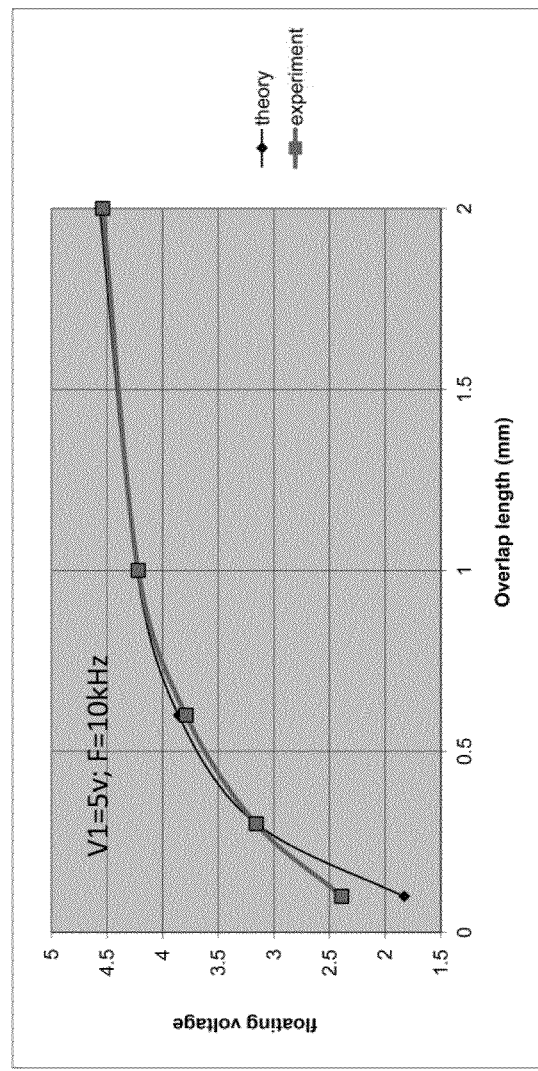
FIG. 12 is the comparison of experimental and theoretical data concerning the capacitive coupling scheme presented in FIG. 11.

The concept we propose here is based on the coupling or the transfer of the electrical potential from one electrode (connected one) to another electrode (the floating one). The experimental confirmation of such a transfer is made by using two electrode areas which had different "overlap areas" (but still being positioned at the same distance d=100 um from the ground electrode) and separated by a dielectric $SiO_2$ of 0.5 um thickness, see FIG. 11. The application of the same voltage $V_1$ (on the top "connected" electrode) induces voltage $V_i$ on the floating electrode and the value of $V_i$ depends upon the overlap area, as demonstrated (both theoretically and experimentally) in the FIG. 12.

Figure 13A:
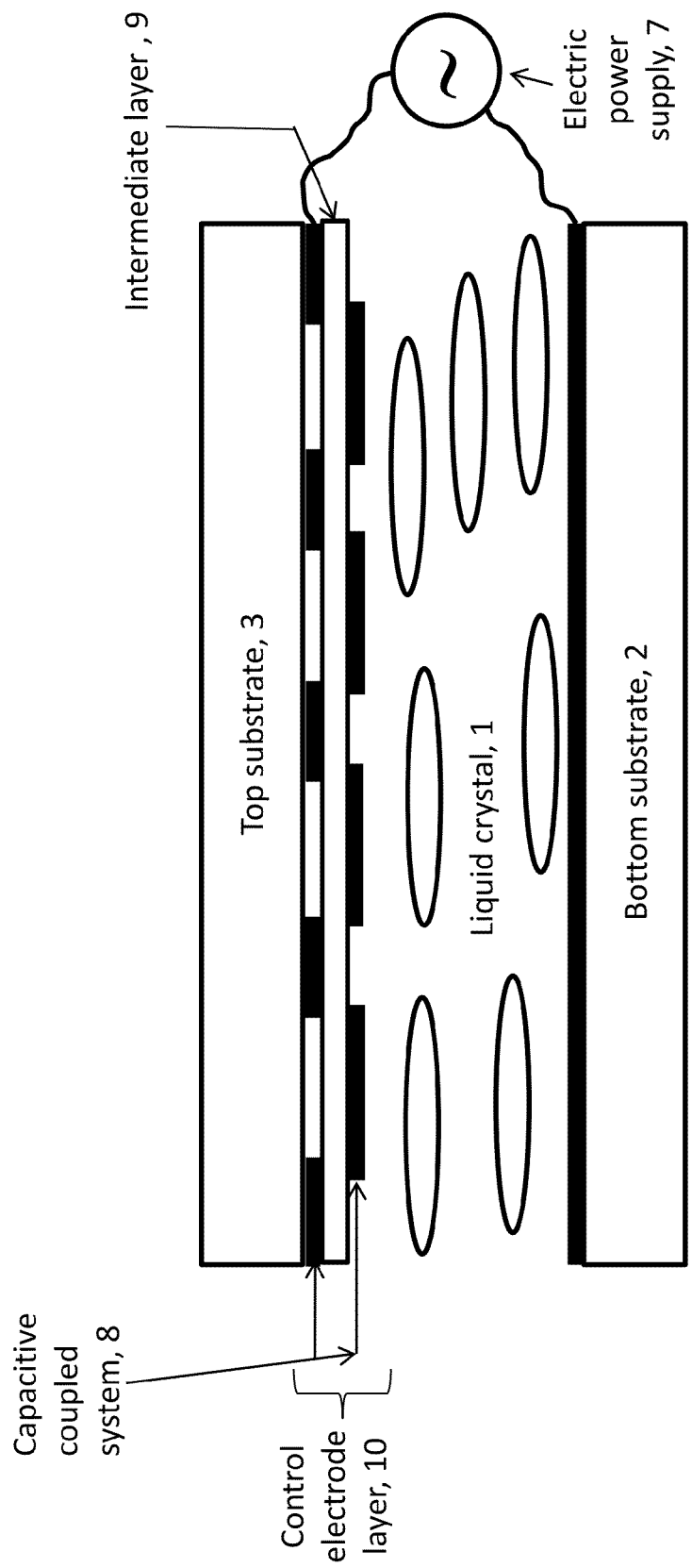
FIG. 13a is a schematic representation of the polarization dependent LCL ("half" lens) using two levels of multiple transparent concentric ring electrodes which are floating (except the external ring and the bottom uniform electrode) and are electrically coupled via the capacitive effect.

Based on the above mentioned capacitive coupling phenomenon, we propose, in a first embodiment of our invention, a new LCL design, shown in FIG. 13a, where the spatial shaping of the electric field is achieved by the controllable degree of coupling between two neighboring concentric ring structures (positioned at different levels, one from each side of the "intermediate material" layer 9). Namely, the unique driving voltage here is applied between the TUE (on the top of the bottom substrate 2) and the external ring structure (which may be considered as an HPE) that is placed on the bottom of top substrate 3. For convenience, we shall further call this electrode level as "level 2" and the electrodes on the level that is closer to the LC layer will be called as "level 1".

Then the electrical potential is coupled from the HPE to the closest ring-shaped electrode (RSE) on the opposed surface of the intermediate layer 9. This gradual (step by step) coupling process (between electrode segments at level 1 and level 2) may be well controlled and designed by the design parameters of the LCL, such as the thickness and the complex dielectric constant of the intermediate material layer, the numbers, the widths w and the gaps g of top (level 2) and bottom (level 1) ring shaped electrodes, which have different radius, as shown in FIG. 13b.

The overlap in the embodiment of FIG. 13b is a uniform overlap extending over the whole of electrode segment. However, it will be appreciated that the overlap that provides the coupling can be provided over a portion of the RSE. For example, there may be a radially projecting tab that extends from one RSE to another.

The advantages of such an approach are many. One of them: there are no zones here without electrodes There is always an electrode segment (either at level 1 or level 2) facing the TUE. Thus, there is much softer change of the electrical potential compared to previous segmented solutions. Moreover, only one voltage is required to control such a lens, etc. Before going further, let us note that the LCL described in FIG. 13a will focus only one polarization of light, which is why we can call it as a "half" lens (see hereafter). Note also that well known techniques in the art may be used to optically hide the ring structures and increase the optical transmission of the described structure.

Figure 13C:
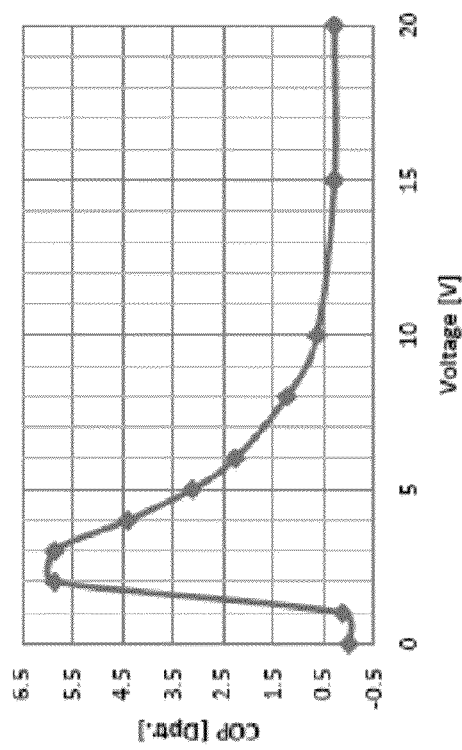
Figure 13D:
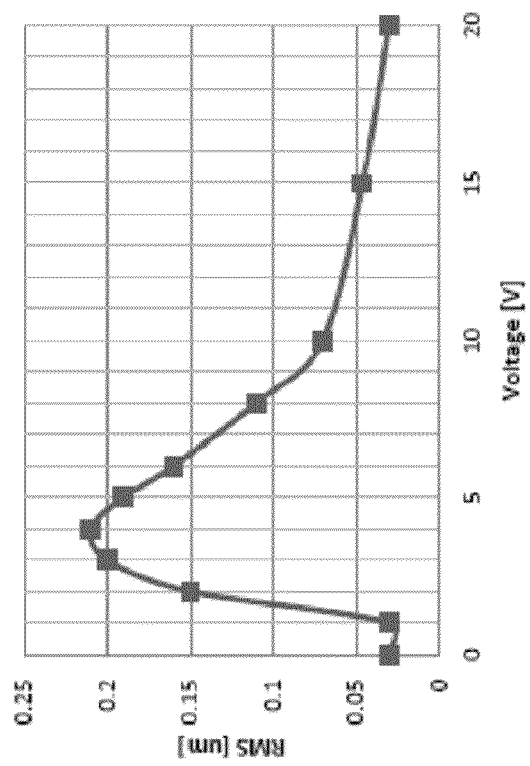

The experimental confirmation of the operation of the proposed design is presented in the form of dependence of Clear Optical Power (COP=the difference of electrically achievable maximum optical power and of the optical power without voltage) versus the unique driving voltage (FIG. 13c), as well as the RMS aberrations' dependence upon the driving voltage (FIG. 13d). Note that, in one possible embodiment, to avoid the use of relatively high voltages (more than 10V) we can use an LCL with negative residual (electrically non-controllable) optical power in a way to achieve zero optical power (imaging the far field objects) without being forced to use either 0 Volt (below the LC reorientation threshold) or high voltages (>10V).

Note that, in another embodiment of this invention, the intermediate material layer 9 may also have a non-negligible complex dielectric constant (a very weakly conductive layer, V-WCL), which may introduce a frequency dependence of the process of potential shaping in space. In this case we can use low voltages (without using residual negative optical power) since we can then fix the voltage (or reduce its required variability) and change the frequency of the driving signal to change the spatial shape of the electric field and thus dynamically control the optical power of the LCL. Typical sheet resistances required for the V-WCL to enable such a frequency control (for example for a frequency variability being in the range of 100 kHz) may be in the range of ~$10^5$ MΩ/. Then, the frequency for which we shall obtain maximal coupling effect (between floating rings) will generate an almost flat (uniform, from the periphery to the center of the LCL) electric field which will force all molecules of the LC to be aligned perpendicular to the substrates of the cell, providing thus a zero optical power. Then, the frequency that would correspond to the reduced coupling effect would allow us the creation of the lens-like electric field and correspondingly higher optical power.

Note also that the connection to the external electrode (HPE) may be done also to the lower level of the double ring structures, not necessarily to the ring structure that is between the top substrate and the intermediate layer but to the ring structure that is between the intermediate material and the LC (or its alignment layer, etc.), FIG. 13b side view.

Figure 14A:
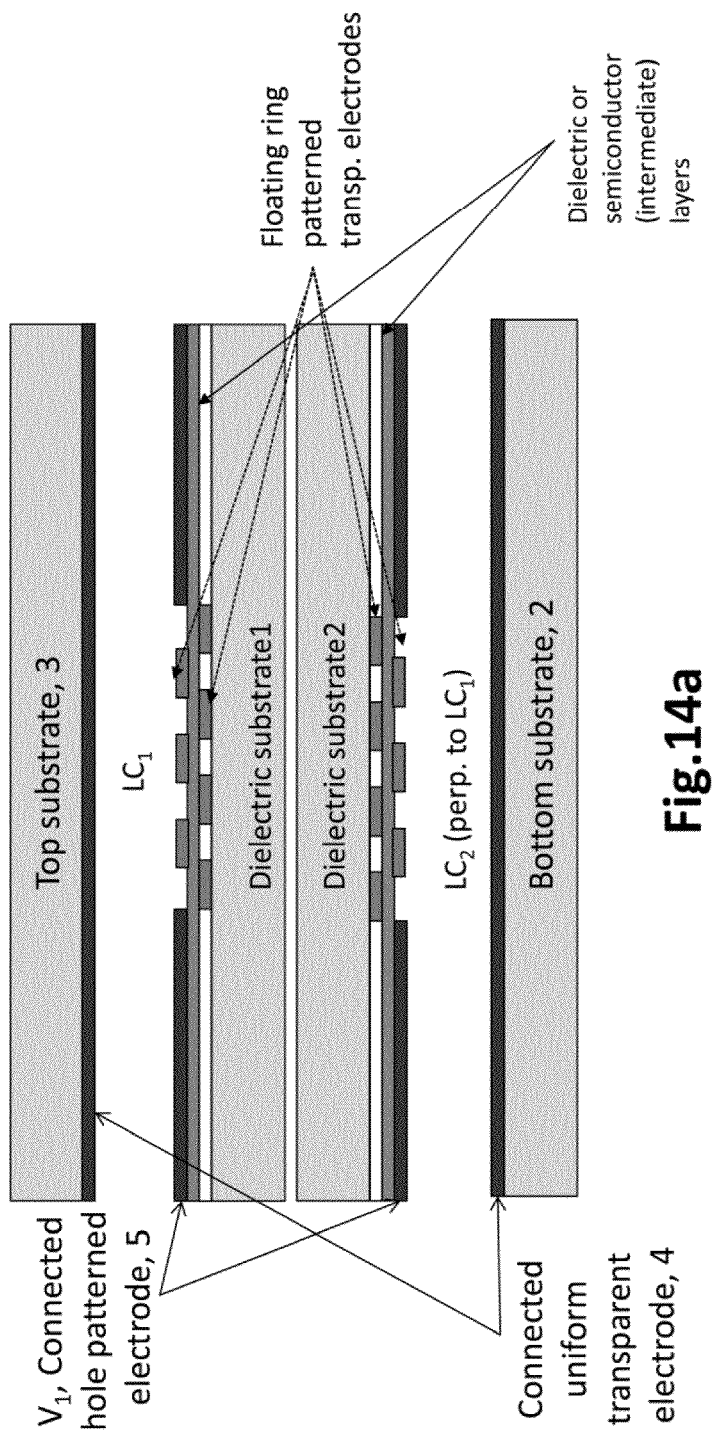
FIG. 14a shows a possible construction of a polarization independent ("full") LCL by using the capacitive coupling concept described in FIG. 13a; the two "half" lenses are built separately and then attached to each other with 90° rotation of their molecular axes (in perpendicular planes).

In another embodiment of the present invention, we propose the fabrication of two "half" lenses, described in FIG. 13a, and their assembly (e.g., by gluing) with approximately 90° rotation of the molecular orientation axis of one of them, FIG. 14a. This is done to enable the similar focusing properties for un-polarized light, which may be represented as a combination of two cross-orientated linearly polarized light components. Thus, each of those linear polarizations will be handled (focused) by one of the "half" lenses. This will provide a "full" lens with polarization independence of its operation.

Figure 14B:
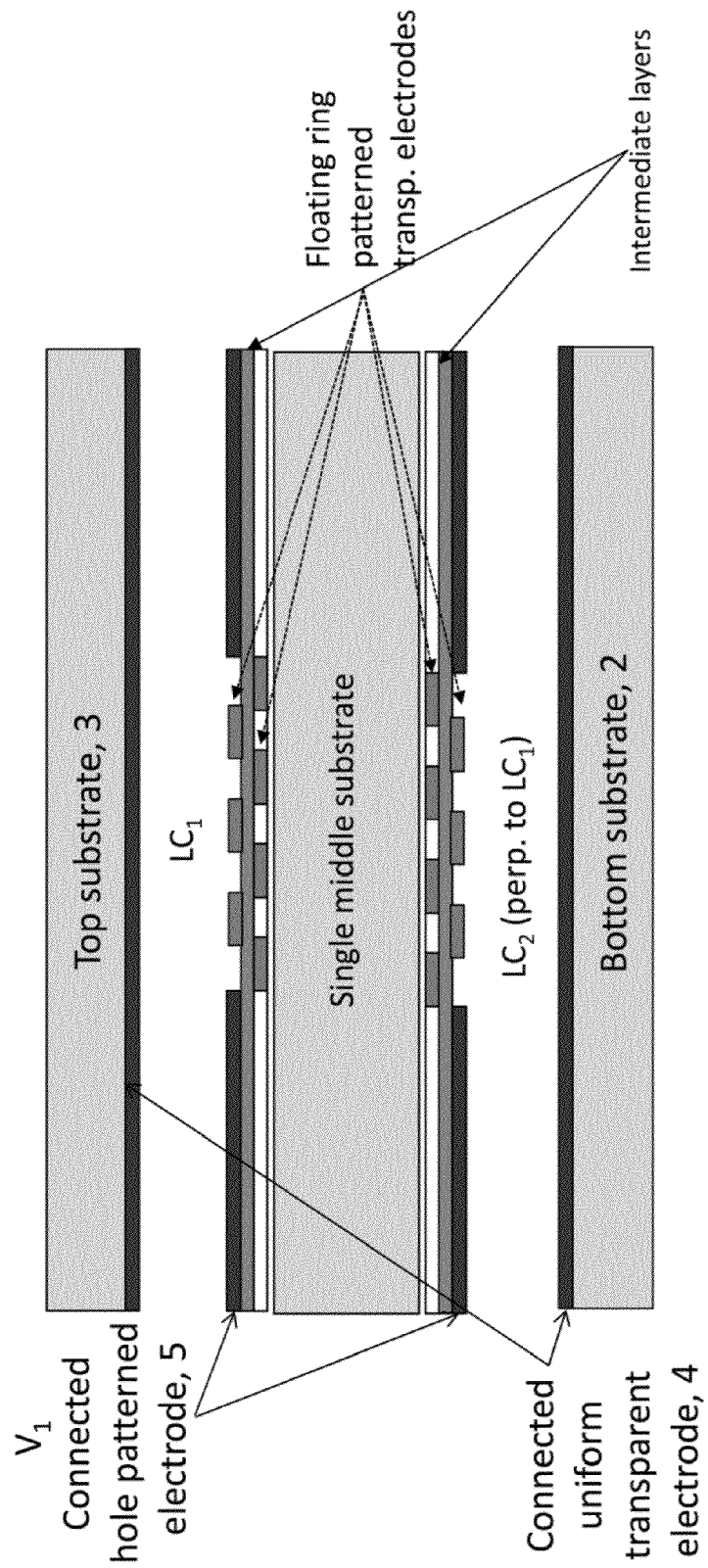
FIG. 14b shows another possible construction of a polarization independent ("full") LCL by using the capacitive coupling concept described in FIG. 13a; only one common middle substrate is applied here along with two LC layers, which have molecular orientations in perpendicular planes (rotated at 90°).

Alternatively, a single middle substrate may be used having at each of its sides the coupled systems of concentric ring systems, FIG. 14b. Then, the two cross oriented LC layers may be assembled from each side of the common (or single) intermediate substrate. In this case, reduced number of lithographic steps and alignment processes may be used, reducing thus significantly the manufacturing cost. In addition, the overall thickness of the LCL may be reduced.

Figure 15A:
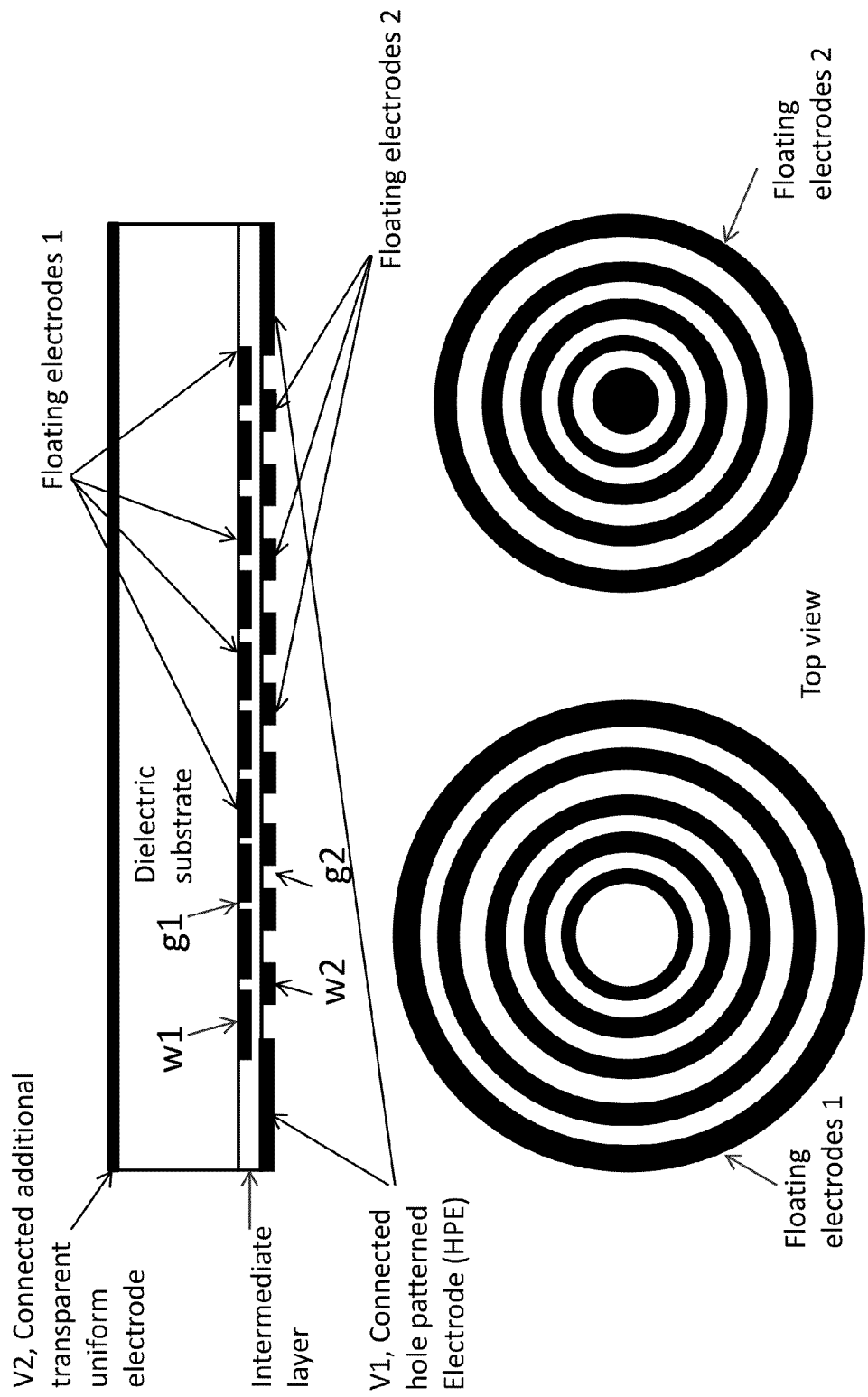
FIG. 15a is a schematic representation of another type of top substrate (that may be used for the capacitive coupled lens principle, shown in FIG. 13a), which, in addition to the two levels of multiple transparent concentric floating ring electrodes, is bearing also a transparent uniform electrode that is electrically connected); upper figure shows the cross-sectional view; bottom figures are top views for ring structures.

In another embodiment of the present invention, we propose the use of an additional TUE, shown in FIG. 15a. For convenience, we shall further call this electrode level as "level 3". In this case, an additional voltage, $V_2$, is also required for better control of the electric field's spatial profile. Thus, the application of the voltage $V_1$, between the previously described structure of capacitive coupled double layer of concentric ring electrodes (only to the external ring) and the bottom TUE (not shown here) will allow to generate a spatially non uniform (lens-like) electric field, refractive index modulation and correspondingly a desired (high) optical power. Furthermore, to control the profile of that lens and, in particular, to reduce the optical power to zero (without going to the state of $V_1$=0), we can apply a voltage $V_2$ to the additional TUE. In the extreme case, if the field generated by this electrode (with $V_2$) is stronger than the field generated thanks to the voltage $V_1$ (applied to the ring structure) then the LC molecules will be everywhere aligned almost perpendicular to the surfaces of the cell and thus providing zero optical power. The advantages of this approach will be the possibility of using an almost arbitrary isolation (i.e. insulation) layer in the place of the "intermediate" layer 9.

Figure 15B:
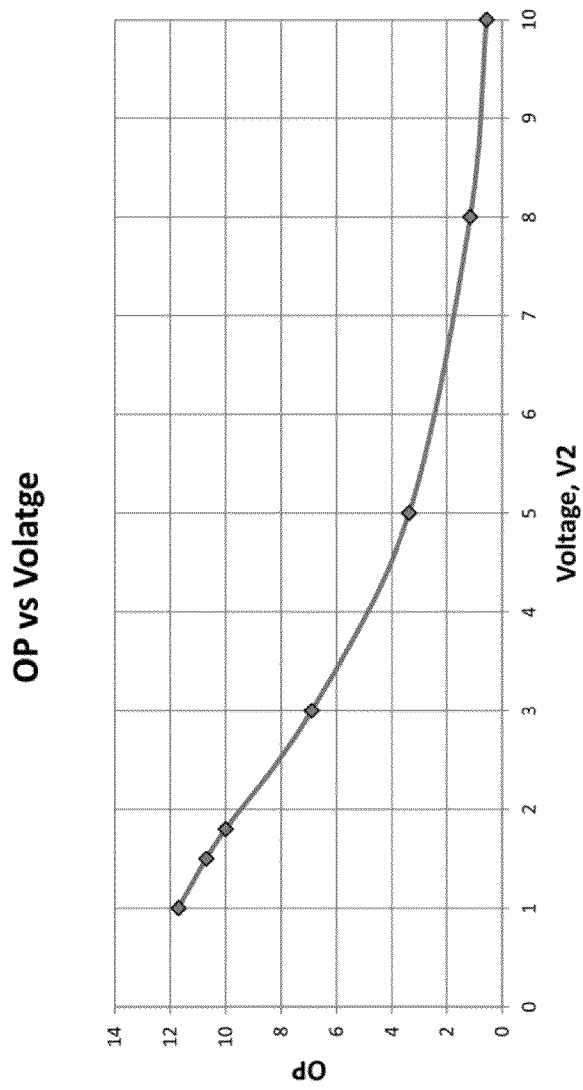
Figure 15D:
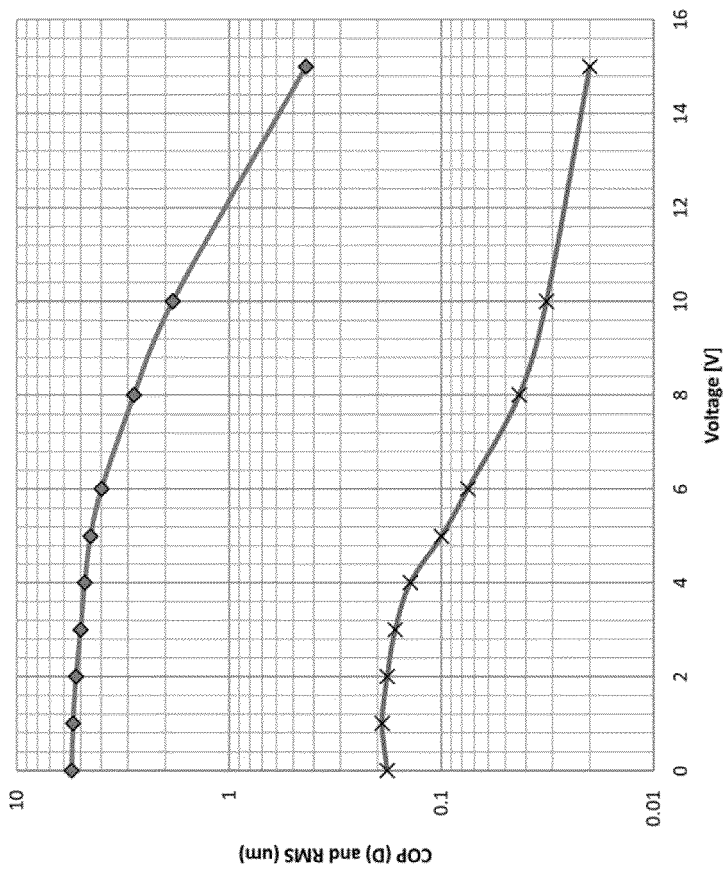

Theoretical simulation was done to predict the performance of this last design. The corresponding simulation parameters are: LC thickness=40 um, Glass substrate (between the additional electrode and coupled double structure of ring electrodes) thickness=50 um, $W_1$=170 um, $g_1$=30 um, $W_2$=$g_2$=100 um, Dielectric (intermediate materials thickness=1 um, Dielectric constant=8, HPE's electrode voltage=5 v, Additional uniform electrode voltage=2.26 v. At least the voltage $V_2$ should be variable. The obtained results for the optical power and wave front aberrations are described in FIG. 15b and FIG. 15c respectively. Corresponding experimental results, for the dependence of clear optical power (diopters) and RMS aberrations (um) versus the voltage $V_2$ (applied to the additional TUE) are presented in FIG. 15d.

Figure 16A:
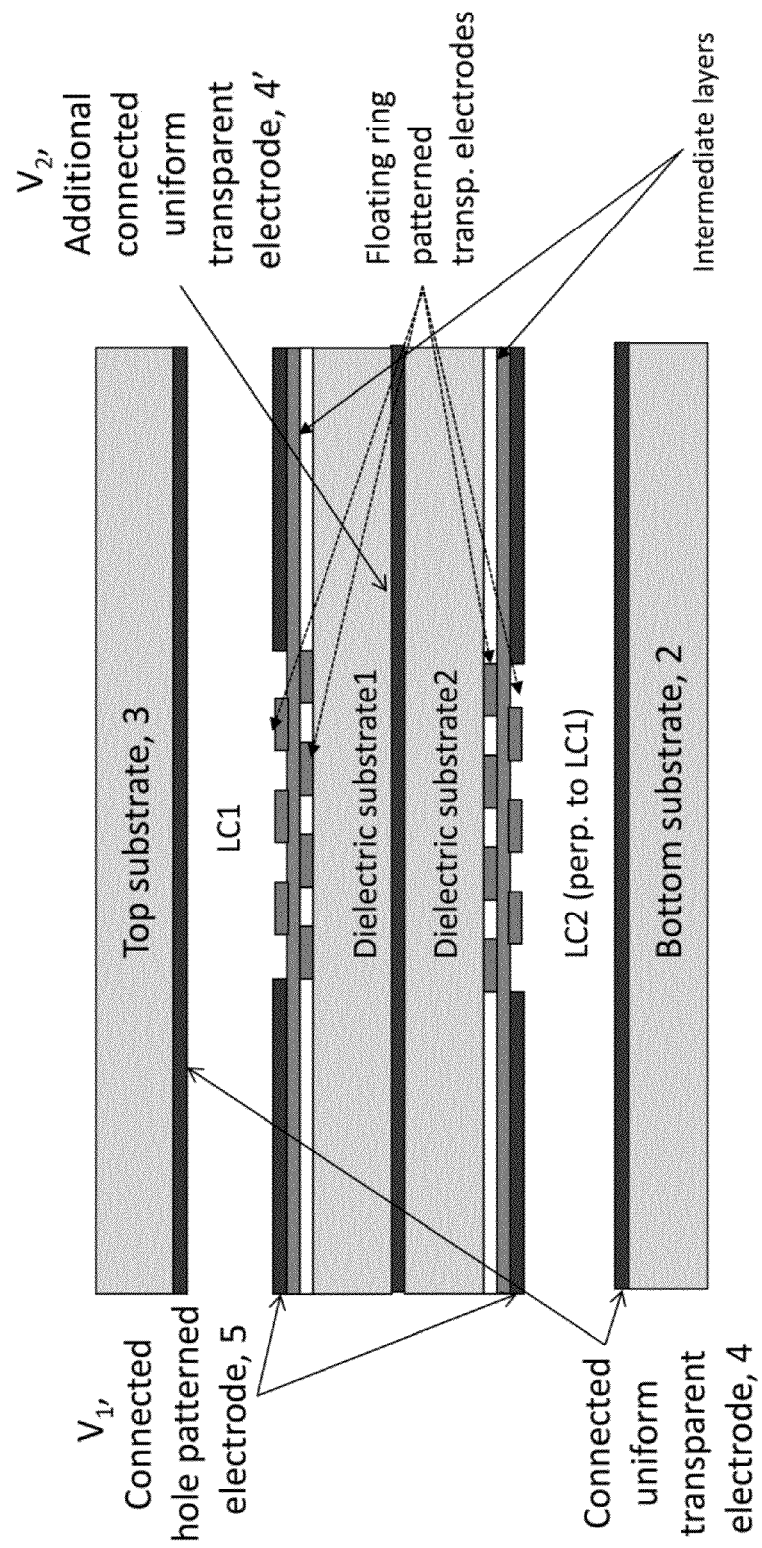
FIG. 16a shows a possible construction of a polarization independent ("full") LCL by using the capacitive coupling concept (described in FIG. 13a) with the modified top substrate, described in FIG. 15a; the two "half" lenses are built separately and then are attached to each other with 90° rotation of their molecular axes (in perpendicular planes).

In another embodiment of this invention, we can build a polarization independent LCL by using two above mentioned "half" lenses, rotating them to obtain 90° (crossed) orientation of their molecular alignments and gluing them together as illustrated in FIG. 16a.

Figure 16B:
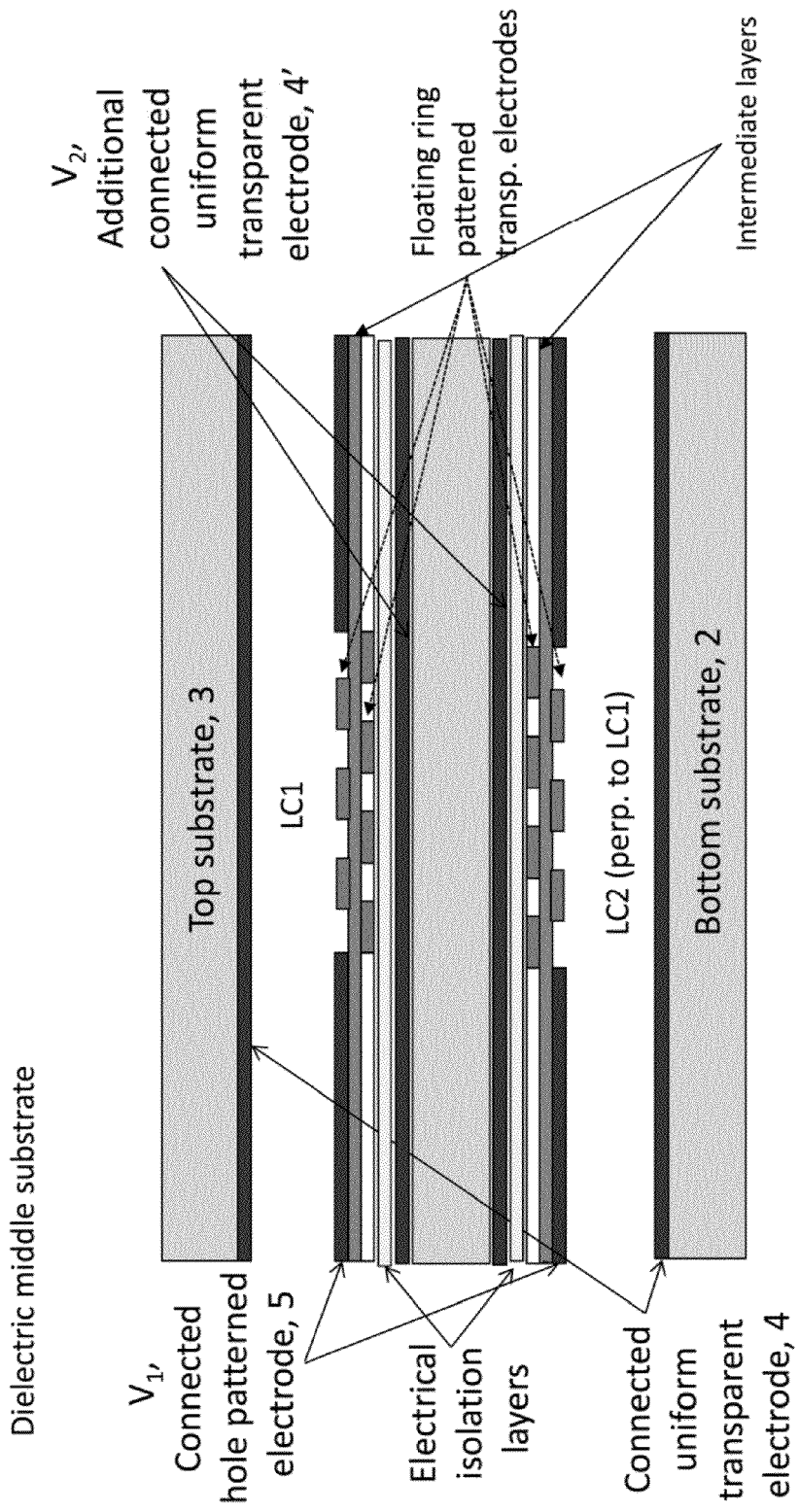
FIG. 16b shows another possible construction of a polarization independent ("full") LCL by using the capacitive coupling concept, described in FIG. 13a, and the modified top substrate, introduced in FIG. 15a; only one common middle substrate is applied here along with two LC layers, which have molecular orientations in perpendicular planes (rotated at 90°).

Alternatively, a single (or common) middle substrate may be built, which is covered from each sides by the additional TUE, by a first intermediate layer (for isolation or insulation), and by a capacitive coupled double layer of floating ring structures, as shown in FIG. 16b. This may allow reduced number of lithographic and positional operations, reducing thus the manufacturing cost.

Figure 17A:
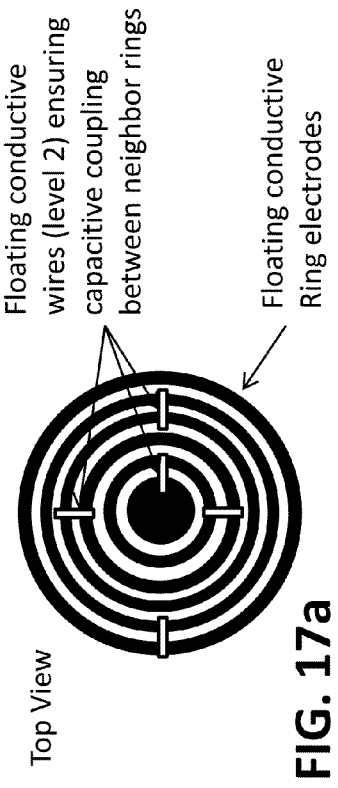
FIG. 17a shows another possible way of achieving capacitive coupling between neighboring concentric ring electrodes by using discrete bridges (oriented at different directions) instead of a second level of concentric rings.

In another embodiment of the present invention, we propose to use other forms of floating electrodes to perform the capacitive coupling. Namely, the above mentioned double ring structure may be replaced by only one layer of concentric floating ring electrodes (at level 1), while their capacitive coupling may be achieved by using non-concentric (here, rectangular, just for example) capacitive bridges placed at level 2, see FIG. 17. In this case also we use an intermediate material between one-level ring layer and the transparent (here rectangular, for example) capacitively bridging transparent electrodes, FIG. 17a. The distribution of those capacitive bridges may be different, including cases of almost equal angular distribution (FIG. 17a) or quasi linear alignment FIG. 17b). The last one (FIG. 17b) eventually could simplify the manufacturing process since the relative shift of those rectangular electrodes (with respect to the concentric ring electrodes) in a given (let us say, horizontal) direction would reduce the coupling overlap area from one side of concentric rings, but the same shift would increase the overlap area in the opposed direction. Thus, the overall overlap area will remain almost the same. Since each ring is considered as conductive, the overall potential distribution will be the same on that ring.

Figure 17C:
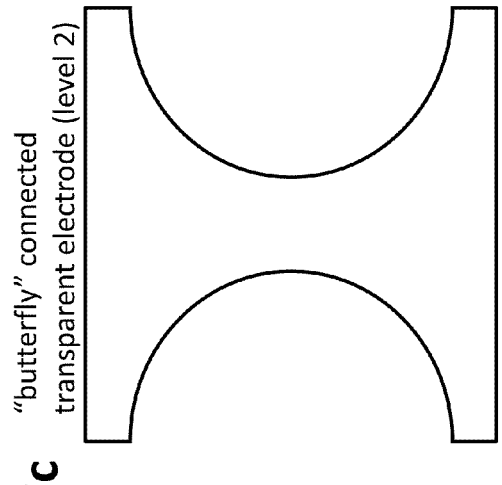
FIG. 17c shows another possible way of achieving capacitive coupling between neighboring concentric ring electrodes by using a single (with one axes) "butterfly" connected electrode instead of using discrete capacitive bridges.
Figure 17B:
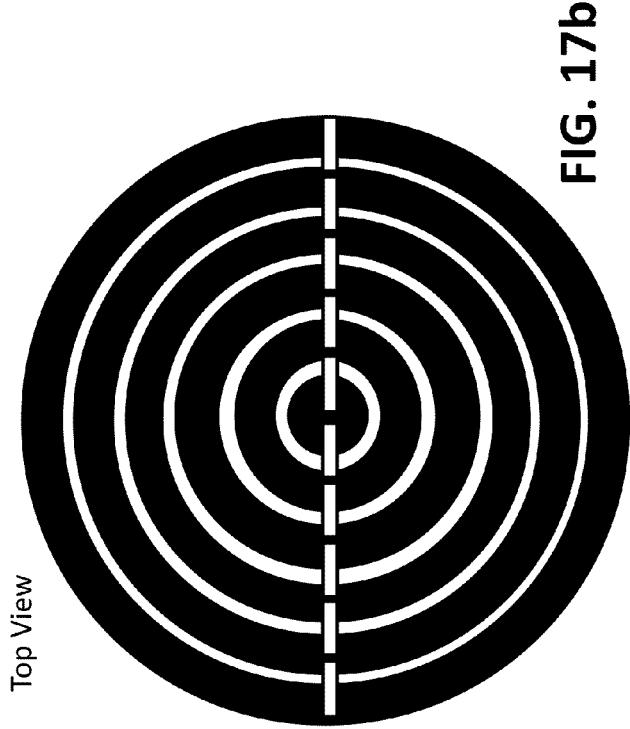
FIG. 17b shows another possible way of achieving capacitive coupling between neighboring concentric ring electrodes by using discrete bridges (oriented approximately in the same direction) instead of a second level of concentric rings.

FIG. 17c schematically shows another embodiment according to which we present another possible way of achieving gradual capacitive coupling between neighboring concentric ring electrodes (at level 1) by using a single (with one axes) "butterfly" connected (with voltage $V_1$) electrode structure (placed at level 2) instead of using discrete capacitive bridges. This approach could relax significantly the manufacturing requirements.

FIG. 17d schematically shows another embodiment according to which the capacitive coupling between neighboring concentric ring electrodes (at level 1) is achieved by using a crossed (with two axes) or "Maltese-cross" connected (with voltage $V_1$) electrode structure (placed at level 2) instead of using discrete capacitive bridges.

FIG. 17e schematically shows the combination of the floating ring shaped electrodes (at level 1) and of the "butterfly" connected electrode with a voltage $V_1$ applied (at level 2) to insure the capacitive coupling.

FIG. 17f shows a possible way of adding a third connected electrode (level 3 and with a voltage $V_2$ applied) that may be used additionally (to the butterfly electrode) and in a complementary way to control the field profile across the lateral direction of the lens. In this way, the voltages $V_1$ and $V_2$ may be chosen in a way to obtain a uniform electric field profile across the lens surface and thus a zero OP.

Figure 18A:
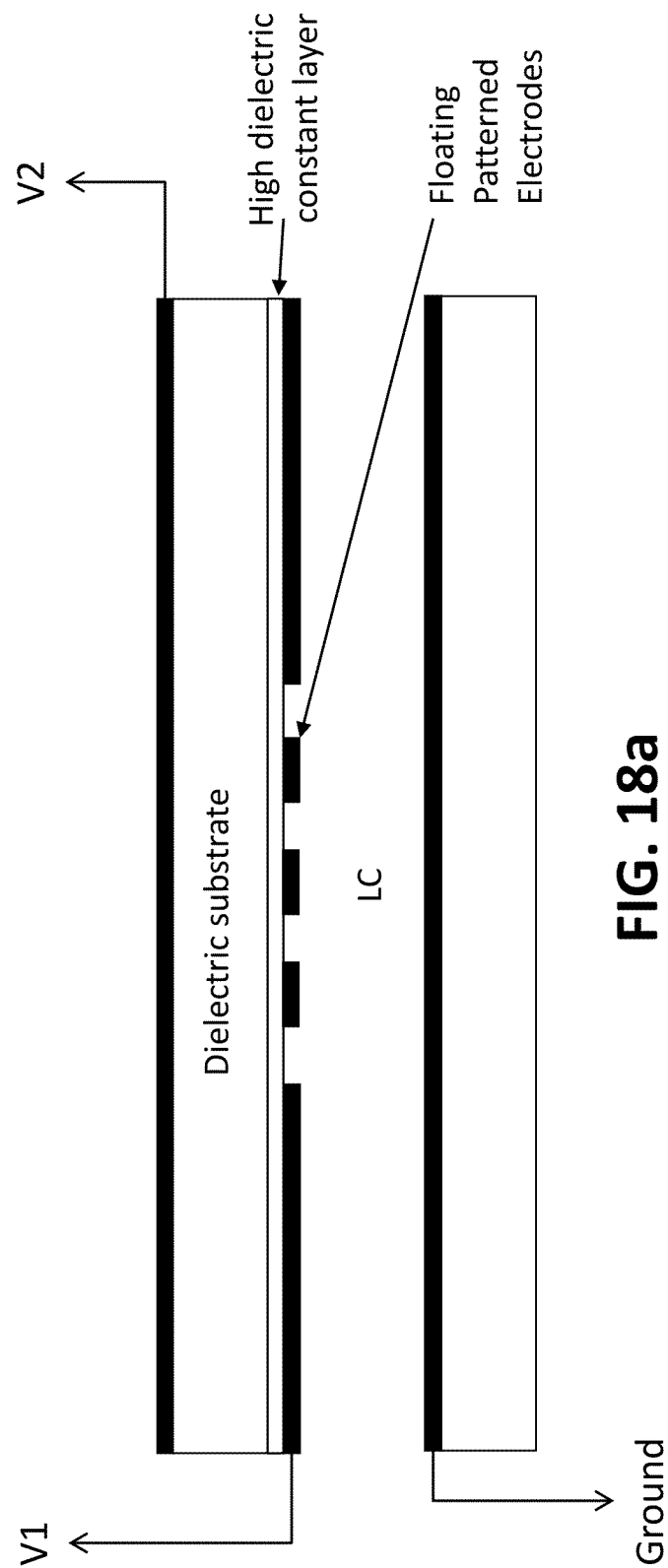
FIG. 18a shows another possible way of achieving capacitive coupling between neighboring concentric ring electrodes by using a layer with high dielectric constant instead of a second level of concentric rings.

Still in another embodiment of the present invention, we propose the use of a high dielectric constant material to replace one of the floating ring electrode layers. Thus, as shown in FIG. 18a, the control electrode layer now is composed only from one layer of floating multiple concentric ring electrodes, which however are covered by a material layer which has high dielectric constant. In this case, as it is shown (FIG. 18b) by our theoretical simulations, we can obtain predetermined coupling of electrical potential between neighboring floating ring electrodes by the choice of the number of ring, their relative distances, widths and the thickness and the dielectric constant of the high dielectric constant layer, in a way to generate a desired wave front, for various optical power levels, FIG. 18b.

In another embodiment of the current invention, additional lateral segmentation of connected (FIG. 19a) and floating (FIG. 19b) electrode structures is proposed to generate non centro symmetric, asymmetric, aspheric, tilted, etc. forms of wave front for various applications such as additional aberration correction, tilt or optical image stabilization.

In another embodiment of the current invention, parallel orientation of connected and floating electrode structures is proposed (instead of concentric ring structures) to generate "cylindrical" lens type single or arrayed devices for lensing, 2D to 3D television, etc.

In another embodiment of the current invention we propose the use of subsequent lithography process to fabricate the two layers of floating and capacitively coupled multiple concentric ring electrodes. Depending upon the manufacturing approach adopted (single middle glass or separate glasses) this lithography process may be applied to one or two surfaces of glass substrates. A nonrestrictive example of corresponding manufacturing process may start by using a substrate (glass, polymer, ceramics, etc.) bearing an index matched uniform ITO, that is then etched (wet or dry) or laser ablated or otherwise patterned and is then covered by an intermediate material layer of specific thickness (e.g., several hundreds of nanometers) and specific dielectric constant. Then another transparent conductive electrode layer is deposited either in the patterned form or uniformly and then is patterned.

The invention claimed is:

1. A liquid crystal lens or optical device comprising:
  a liquid crystal cell having:
    planar cell walls;
    alignment coatings on the cell walls;
    a liquid crystal material in contact with the cell walls;
    an electrode structure having:
      a plurality of capacitively coupled electrode segments separated by at least one insulating layer;
      an opposed electrode;
      wherein an electric field can be provided between the electrode segments and the opposed electrode within the liquid crystal cell;
      wherein a voltage applied to a first segment of the plurality of segments induces a reduced voltage in subsequent capacitively coupled segments of said plurality of segments;
      wherein the arrangement of said segments corresponds to a desired electric field spatial profile across an aperture of the liquid crystal cell.

2. A liquid crystal lens or optical device comprising:
  a liquid crystal cell having:
    planar cell walls;
    alignment coatings on the cell walls;
    a liquid crystal material in contact with the cell walls;
    an electrode structure having:
      a plurality of capacitively coupled electrode segments separated by at least one intermediate layer, at least neighboring capacitively coupled electrode segments being configured to at least partially overlap; and
      an opposed electrode across the liquid crystal layer from said plurality of capacitively coupled electrode segments;
      wherein an electric field can be provided between the electrode segments and the opposed electrode within the liquid crystal cell;
      wherein a voltage applied to a first segment of the plurality of segments induces a reduced voltage in subsequent electrically floating capacitively coupled segments of said plurality of segments; and
      wherein the arrangement of said segments corresponds to a desired electric field spatial profile across an aperture of the liquid crystal cell.

3. A device as claimed in claim 2, wherein said optical device is a cylindrical lens, said electrode structure comprising strips of substantially parallel electrode segments and said first capacitively coupled electrode segment comprising outer ones of said parallel electrode segment strips.

4. A device as claimed in claim 2, wherein said optical device is a liquid crystal lens, said electrode structure comprising a substantially circular aperture, said plurality of capacitively coupled electrode segments comprising a plurality of substantially concentric capacitively coupled electrode segments, and said first capacitively coupled electrode segment comprising an outer hole patterned electrode.

5. A device as claimed in claim 2, wherein each capacitively coupled electrode segment further comprises circumferential subsegments for providing wavefront control via said optical device, preferably further comprising a controller configured to provide time-varying adjusted voltages to said subsegments for optical image stabilization.

6. A device as claimed in claim 2, wherein said plurality of capacitively coupled electrode segments is divided into first group of segments and second group of segments on corresponding layers separated by one of: an insulation layer and a high dielectric constant layer, applied over said first group of capacitively coupled electrode segments.

7. A device as claimed in claim 6, wherein each electrode segment of the second group of electrode segments partially overlaps adjacent neighboring electrode segments of the first group of electrode segments.

8. A device as claimed in claim 2, said electrode structure comprising one of:

a dielectric substrate over a substantially flat transparent electrically conductive electrode layer; and an insulation layer over a substantially flat transparent conductive electrode layer.

9. A device as claimed in claim 2, said electrode structure comprising one of:

a butterfly shaped connected transparent electrode partially overlapping each electrode segment, said partial overlap increasing gradually with aperture position; and a first Maltese-cross shaped connected transparent electrode partially overlapping each electrode segment.

10. A device as claimed in claim 9, said electrode structure comprising a second Maltese-cross oriented complimentary to said first Maltese-cross.

11. A device as claimed in claim 2, said electrode structure comprising one of:

a plurality of electrically floating conductive transparent capacitive bridges, each capacitive bridge partially overlapping adjacent electrode segments.

12. A device as claimed in claim 2, comprising:

a pair of said liquid crystal cells arranged to act on corresponding orthogonal polarizations of light, each liquid crystal material being sandwiched between a corresponding pair alignment layers between planar and substantially parallel liquid crystal cell walls, each said pair of alignment layers selecting a predetermined liquid crystal molecular orientation in the corresponding liquid crystal material defining a corresponding director orientation, said directors in the pair of liquid crystal material layers being substantially orthogonal to one another for providing polarization independent operation of said liquid crystal optical device; and said electrode structure being arranged on said liquid crystal cell walls being separately provided for each of said pair of liquid crystal cells.

13. A device as claimed in claim 2, wherein said intermediate layer allows said desired electric field spatial profile to be essentially invariant as a function of a frequency of a control signal applied to said first segment.

14. A device as claimed in claim 13, further comprising an electrode covering at least a central part of said aperture for creating an electric field separately from said electrode segments.

15. A device as claimed in claim 2, wherein said intermediate layer provides a small amount of conductivity and allows said desired electric field spatial profile to be essentially controlled as a function of a frequency of a control signal applied to said first segment.

16. A device as claimed in claim 14, further comprising a drive signal controller configured to provide at least one variable electrical signal of a predetermined voltage and frequency selected according to a desired variable optical property of the device, wherein preferably frequency is used to control the optical property.

17. A device as claimed in claim 2, wherein the device is a tunable lens.

18. A device as claimed in claim 2, wherein said device has a flat planar geometry.

19. A device as claimed in claim 2, wherein said neighboring capacitively coupled electrode segments are configured to overlap such that an electrode segment is always present opposite said opposed electrode providing a smoother change in said electric field spatial profile across said aperture.

20. A liquid crystal lens or optical device comprising:

a liquid crystal cell having:
   planar cell walls;
   alignment coatings on the cell walls;
   a liquid crystal material in contact with the cell walls;

an electrode structure having:
   a plurality of electrically coupled electrode segments separated by at least one intermediate layer, said plurality of electrode segments including at least two neighboring electrically floating electrode segments; and
   an opposed electrode across the liquid crystal layer from said plurality of electrically coupled electrode segments;

wherein an electric field can be provided between the electrode segments and the opposed electrode within the liquid crystal cell;

wherein a voltage applied to a first segment of the plurality of segments induces a reduced voltage in subsequent electrically floating electrically coupled electrode segments of said plurality of electrode segments; and wherein the arrangement of said segments corresponds to a desired electric field spatial profile across an aperture of the liquid crystal cell.

21. A device as claimed in claim 20, said electrically coupled electrode segments being configured provide gradual step by step coupling between electrically floating neighboring electrode segments.

* * * * *